United States Patent
Hanatani et al.

(10) Patent No.: US 8,934,631 B2
(45) Date of Patent: Jan. 13, 2015

(54) DECOMPRESSING APPARATUS AND COMPRESSING APPARATUS

(75) Inventors: Yoshikazu Hanatani, Kanagawa (JP); Taichi Isogai, Tokyo (JP); Hirofumi Muratani, Kanagawa (JP); Tomoko Yonemura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 633 days.

(21) Appl. No.: 13/225,964

(22) Filed: Sep. 6, 2011

(65) Prior Publication Data

US 2012/0150931 A1  Jun. 14, 2012

(30) Foreign Application Priority Data

Dec. 9, 2010 (JP) .................................. 2010-275160

(51) Int. Cl.
*H04K 1/00* (2006.01)
*H04L 9/30* (2006.01)
*G09C 1/00* (2006.01)

(52) U.S. Cl.
CPC ........................................ *G09C 1/00* (2013.01)
USPC ............................................ 380/269; 380/30

(58) Field of Classification Search
CPC ................... G11B 20/00007; G11B 20/00086; G11B 20/0021; H04L 9/00; H04N 7/26
USPC ........ 380/28, 30, 43, 269, 277; 708/203, 204, 708/277
See application file for complete search history.

(56) References Cited

U.S. PATENT DOCUMENTS 8,233,616 B2 * 7/2012 Muratani et al. ................ 380/28
8,311,215 B2 * 11/2012 Akiyama et al. ................ 380/30
8,438,205 B2 * 5/2013 Yonemura et al. ............ 708/492
8,533,243 B2 * 9/2013 Yonemura et al. ............ 708/204
8,543,630 B2 * 9/2013 Yonemura et al. ............ 708/492

(Continued)

FOREIGN PATENT DOCUMENTS

| WO | WO 2010/145983 A1 | 12/2010 |
| WO | WO 2011/010383 A1 | 1/2011 |
| WO | WO 2011/030468 A1 | 3/2011 |
| WO | WO 2011/033672 A1 | 3/2011 |

OTHER PUBLICATIONS

K. Rubin and A. Silverberg, compression in finite fileds and torus-based cryptography, 2000, Mathematic subject classification, p. 1-28.*

(Continued)

*Primary Examiner* — Abu Sholeman
(74) *Attorney, Agent, or Firm* — Oblon, Spivak, McClelland, Maier & Neustadt, L.L.P.

(57) ABSTRACT

According to one embodiment, a decompressing apparatus includes an input unit, a calculating unit, a first selecting unit, and a decompressing unit. The input unit inputs additional data, which is obtained based on trace expression data in which an element in a subgroup of a multiplicative group of a finite field is trace-expressed and affine expression data in which the trace expression data is affine-expressed, and the trace expression data. The calculating unit calculates a plurality of solutions of simultaneous equations derived by the trace expression data. The first selecting unit selects any of a plurality of items of affine expression data in which the element is affine-expressed based on the additional data, the affine expression data being found from the solutions. The decompressing unit decompresses the selected affine expression data to the element.

5 Claims, 10 Drawing Sheets

(56) References Cited

U.S. PATENT DOCUMENTS

| | | | |
|---|---|---|---|
| 8,548,162 B2* | 10/2013 | Joye ................................ | 380/28 |
| 8,675,874 B2* | 3/2014 | Muratani et al. .............. | 380/269 |
| 2009/0207999 A1 | 8/2009 | Yonemura et al. | |
| 2010/0046741 A1* | 2/2010 | Isogai et al. .................... | 380/28 |
| 2010/0046742 A1* | 2/2010 | Muratani et al. ................ | 380/28 |
| 2010/0046743 A1* | 2/2010 | Muratani et al. ................ | 380/28 |
| 2010/0046745 A1 | 2/2010 | Hanatani et al. | |
| 2010/0046746 A1* | 2/2010 | Yonemura et al. .............. | 380/30 |
| 2010/0049777 A1 | 2/2010 | Yonemura et al. | |
| 2010/0063986 A1 | 3/2010 | Yonemura et al. | |
| 2010/0226496 A1* | 9/2010 | Akiyama et al. ................ | 380/30 |
| 2013/0246489 A1* | 9/2013 | Yonemura et al. ............ | 708/200 |

OTHER PUBLICATIONS

Karl Rubin, et al., "Torus-Based Cryptography," CRYPTO 2003, LNCS 2729, 2003, 17 pages.

Koray Karabina, "Torus-Based Compression by Factor 4 and 6," Cryptology ePrint Archive, Report 2010/525, 20 pages.

Office Action issued Oct. 2, 2012 in Japanese Patent Application No. 2010-275160 with English language translation.

Marc Joye, On Cryptographic Schemes Based on Discrete Logarithms and Factoring, Lecture Notes in Computer Science, 2009, vol. 5888, pp. 41-52 with cover page.

\* cited by examiner

DECOMPRESSING APPARATUS AND COMPRESSING APPARATUS

CROSS-REFERENCE TO RELATED APPLICATIONS

This application is based upon and claims the benefit of priority from Japanese Patent Application No. 2010-275160, filed on Dec. 9, 2010; the entire contents of which are incorporated herein by reference.

FIELD

Embodiments described herein relate generally to a decompressing apparatus and a compressing apparatus for elements over a finite field.

BACKGROUND

Some of public key encryptions are configured by use of a subset of a finite field (a set of numbers; the four arithmetic operations are possible by only the elements in the set). Assuming that the number of elements in the subset is A and the number of elements in the finite field is B, A≤B is given. For example, A=2^160 and B=2^1024 are used for the public key encryptions. Generally, the number of bits required for expressing X elements is $\log_2 X$ bits. However, although only A elements in the subset are used for the existing public key encryptions, some encryption systems require $\log_2 B$ bits for expressing the elements.

Elements in a subset of a finite field, which is called algebraic torus, can be expressed with a small number of bits. There is known that when the order of an extension field to which the algebraic torus belongs is a product of powers of two prime numbers p and q, $n=(p^m) \times (q^w)$, at most, a compression rate (=the number of bits after compression/the number of bits before compression) is $\phi(n)/n$. Herein, $\phi$ is Euler's function.

There is also known a method for realizing the compression rate of 1/4 and the compression rate of 1/6. According to the method, further compression is performed by obtaining data D1 in which the elements in an algebraic torus subset are compressed, and obtaining data D2, which is the partly deleted data D1, and an additional bit. Then, multivariable simultaneous equations obtained by a conditional equation of the algebraic torus subset and a relationship between the data D1 and the data D2 are solved so that candidates of the data D1 corresponding to the data D2 are obtained and the compressed data D1 is determined by using the additional bit.

DETAILED DESCRIPTION

Figure 1:
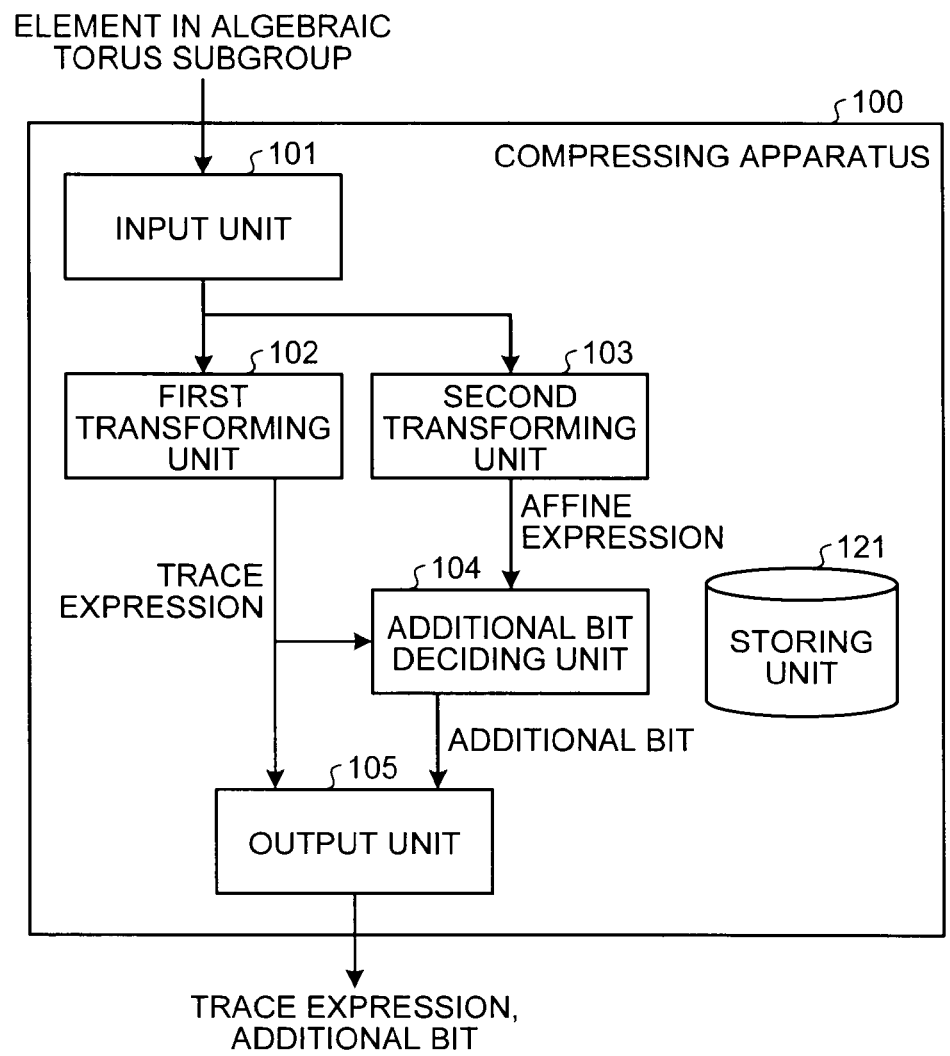
FIG. 1 is a block diagram of a compressing apparatus according to a first embodiment.

In general, according to one embodiment, a decompressing apparatus includes an input unit, a calculating unit, a first selecting unit, and a decompressing unit. The input unit inputs additional data, which is obtained based on trace expression data in which an element in a subgroup of a multiplicative group of a finite field is trace-expressed and affine expression data in which the trace expression data is affine-expressed, and the trace expression data. The calculating unit calculates a plurality of solutions of simultaneous equations derived by the trace expression data. The first selecting unit selects any of a plurality of items of affine expression data in which the element is affine-expressed based on the additional data, the affine expression data being found from the solutions. The decompressing unit decompresses the selected affine expression data to the element.

Exemplary embodiments of a decompressing apparatus will be described below in detail with reference to the accompanying drawings.

First Embodiment

Limitations different from those of the conventional technique are imposed on modulus polynomials so that a compressing apparatus and a decompressing apparatus according to a first embodiment are efficiently configured. In the present embodiment, an element of a finite field expression of algebraic torus is expressed by a trace expression and an additional bit to compress the expression, and the compressed expression is decompressed to the element of the finite field expression of the algebraic torus by the solutions of multivariable simultaneous equations determined by the trace expression and the additional bit. When the multivariable simultaneous equations are solved, a plurality of elements of the finite field expression of the algebraic torus, which are candidates to be decompressed, are obtained so that the additional bit is used to determine the element before the compression.

(1) Structure of Algebraic Torus

First, terms and notations used in the respective embodiments will be explained. Fpm indicates a finite field having $p^m$ elements, and is called an m-th degree extension field of Fp. For example, F3m indicates an m-th degree extension field of a finite field F3 having three elements. In the case of a0, a1, ..., an ∈ Fq, the polynomial $F(x)=a0+a1 \times x + \ldots + an \times x^n$ is called a polynomial over Fq. The polynomial over Fq may be expressed as $F(x)=a0+a1 \times x + \ldots + an \times x^n$ over Fq. Herein, "a^b" indicates the b-th power of a. In the following, the b-th power of a may be expressed as $a^b$.

Assuming that n is an odd number of n≡5 (mod 12) and $q=3^n$ is given, a finite field Fq will be considered. At this time, q≡5 (mod 7) is obtained. By using $\Phi 7=x^6+x^5+x^4+x^3+x^2+x+1$ as a modulus polynomial, a sixth degree extension field of the finite field Fq is considered. The modulus polynomial is not limited to the above-described one, and may be another polynomial such as $\Phi 9=x^6+x^3+a1$.

In this case, $x^q=x^5$, $x^{\{q^2\}}=x^4$, $x^{\{q^3\}}=x^6$, $x^{\{q^4\}}=x^2$, $x^{\{q^5\}}=x^3$ are established over Fq6. The algebraic torus T6 (Fq) over the sixth degree extension field Fq6 has a subgroup having the order of $q-\sqrt{(3q)}+1$. Since q is an odd-number-th power of 3, $\sqrt{(3q)}$ is an integer. Here, it is assumed $\sqrt{(3q)}=t$.

The trace map Tr:Fq6→Fq is defined in the equation (1). Tr(g) is called a trace expression of g.

$$Tr(g)=g+g\hat{}q+g\hat{}\{q\hat{}2\}+g\hat{}\{q\hat{}3\}+g\hat{}\{q\hat{}4\}+g\hat{}\{q\hat{}5\} \quad (1)$$

An affine transform map Af:Fq6→Fq3 and an affine transform inverse map Af^{-1}:Fq3→Fq6 are defined in the equation (2).

$$Af(g)=(G1+1)/G2,$$

$$Af\hat{}\{-1\}(Af(g))=(Af(g)+z)/(Af(g)+z\hat{}q) \quad (2)$$

where $z:=x+x\hat{}\{q\hat{}2\}+x\hat{}\{q\hat{}4\}=x+x\hat{}2+x\hat{}4$ and $g:=a0+a1\times x+a2\times x\hat{}2+a3\times x\hat{}3+a4\times x\hat{}4+a5\times x\hat{}5=(a0+a3\times x\hat{}3+a5\times x\hat{}5)+(a1\times x+a2\times x\hat{}2+a4\times x\hat{}4)=G1+G2\times z$ (where, G1, G2∈Fq3). Af(g) is called an affine expression of g.

(2) Structure of Compressing Apparatus

An exemplary structure of the compressing apparatus and the decompressing apparatus according to the first embodiment will be described. FIG. 1 is a block diagram illustrating an exemplary structure of a compressing apparatus 100 according to the first embodiment. As illustrated in FIG. 1, the compressing apparatus 100 comprises an input unit 101, a first transforming unit 102, a second transforming unit 103, an additional bit deciding unit 104, an output unit 105 and a storing unit 121.

The input unit 101 is directed for inputting an element in an algebraic torus subset to be compressed. The first transforming unit 102 transforms the input element into trace expression data expressed in a trace expression. In the following, the trace expression data will be simply called trace expression. The first transforming unit 102 transforms the input element into the trace expression by the trace map Tr.

The second transforming unit 103 transforms the input element into affine expression data expressed in an affine expression. In the following, the affine expression data will be simply called affine expression. The second transforming unit 103 transforms the input element into the affine expression by the affine transform map Af.

The additional bit deciding unit 104 decides an additional bit based on the trace expression data in which the element in the subgroup of the multiplicative group of the finite field (the algebraic torus of the finite field expression) is trace-expressed and the affine expression data in which the element in the subgroup of the multiplicative group of the finite field is affine-expressed. The additional bit deciding unit 104 decides additional data (hereinafter referred to as additional bit below) for finding the affine expression from the solutions of predetermined simultaneous equations based on the trace expression and the affine expression. In other words, the additional bit is decided based on the candidates of the affine expression obtained by decompressing the trace expression data in which the element in the subgroup of the multiplicative group of the finite field (the algebraic torus of the finite field expression) is trace-expressed and the affine expression data in which the element in the subgroup of the multiplicative group of the finite field (the algebraic torus of the finite field expression) is affine-expressed.

The output unit 105 outputs the trace expression and the additional bit. The storing unit 121 stores information used for finding previously-derived equations to be used for deciding the additional bit.

Figure 2:
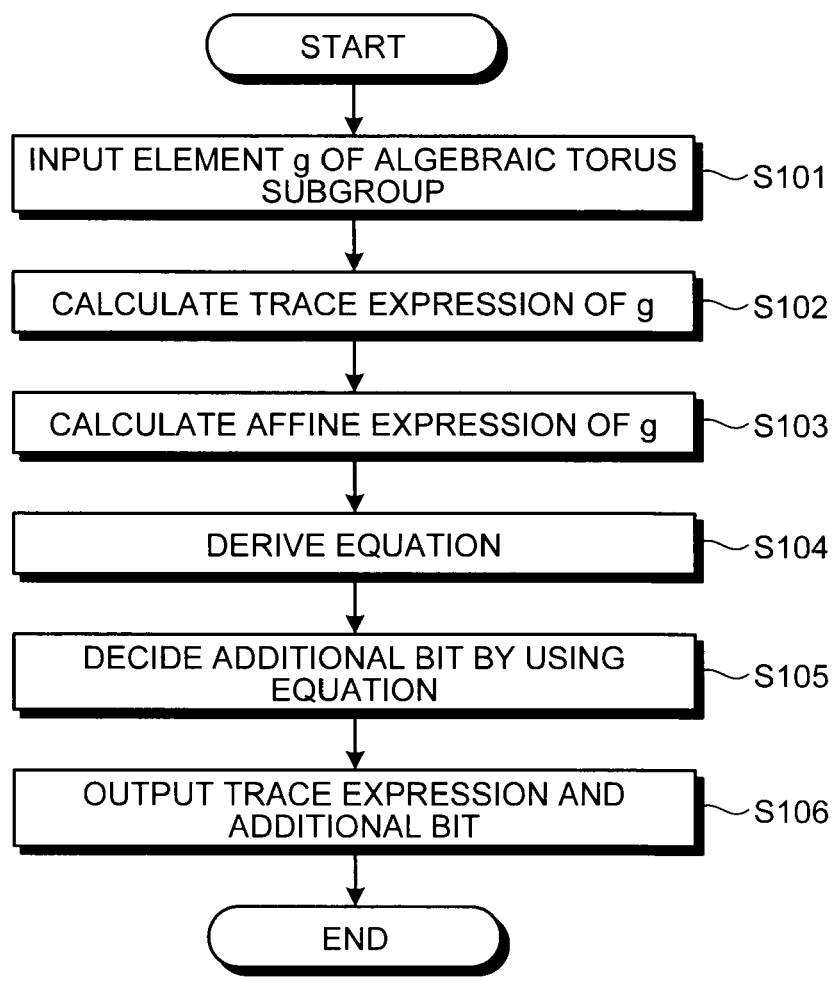
FIG. 2 is a flowchart of a compression processing according to the first embodiment.

Subsequently, compression processing by the compressing apparatus 100 with the above structure according to the first embodiment will be described with reference to FIG. 2. FIG. 2 is a flowchart illustrating a flow of the entire compression processing according to the first embodiment.

The input unit 101 inputs an element g in an algebraic torus subgroup (step S101). The first transforming unit 102 inputs g into the trace map to calculate the trace expression Tr(g) (step S102). The second transforming unit 103 inputs g into the affine map to calculate the affine expression of $(\alpha+1, \beta+1, \gamma+1) \in Fq3$ (step S103). The additional bit deciding unit 104 decides multivariable simultaneous equations derived by the conditions for the trace expression and the algebraic torus and the condition for the finite field (step S104). The additional bit deciding unit 104 solves the multivariable simultaneous equations to decide the additional bit (step S105). Specifically, the additional bit deciding unit 104 solves the multivariable simultaneous equations to obtain six solutions $\{(a_i, b_i, c_i)\}_{i=1,\ldots,6}$, arranges the six solutions in descending order to decide the i-th element coincident with the affine expression of g, and consequently decides i as the additional bit. The output unit 105 outputs the trace expression and the additional bit (Tr(g), i) (step S106). Any method that can discriminate the six solutions may be used for deciding the additional bit not only by arranging and deciding the six solutions in descending order but also by arranging and deciding them in ascending order.

In the present embodiment, the compression at the compression rate of 1/6 can be realized by the trace map Tr:Fq6→Fq. i can be expressed by three bits due to $1 \leq i \leq 6$. In other words, the additional bit i rarely affects the compression rate of 1/6.

The method for deriving the multivariable simultaneous equations (step S104) and the method for solving the multivariable simultaneous equations (step S105) can be achieved with the same structure as a decompressing apparatus 200. The respective processing will be described in detail along with the structure of the decompressing apparatus 200.

(3) Structure of Decompressing Apparatus

Figure 3:
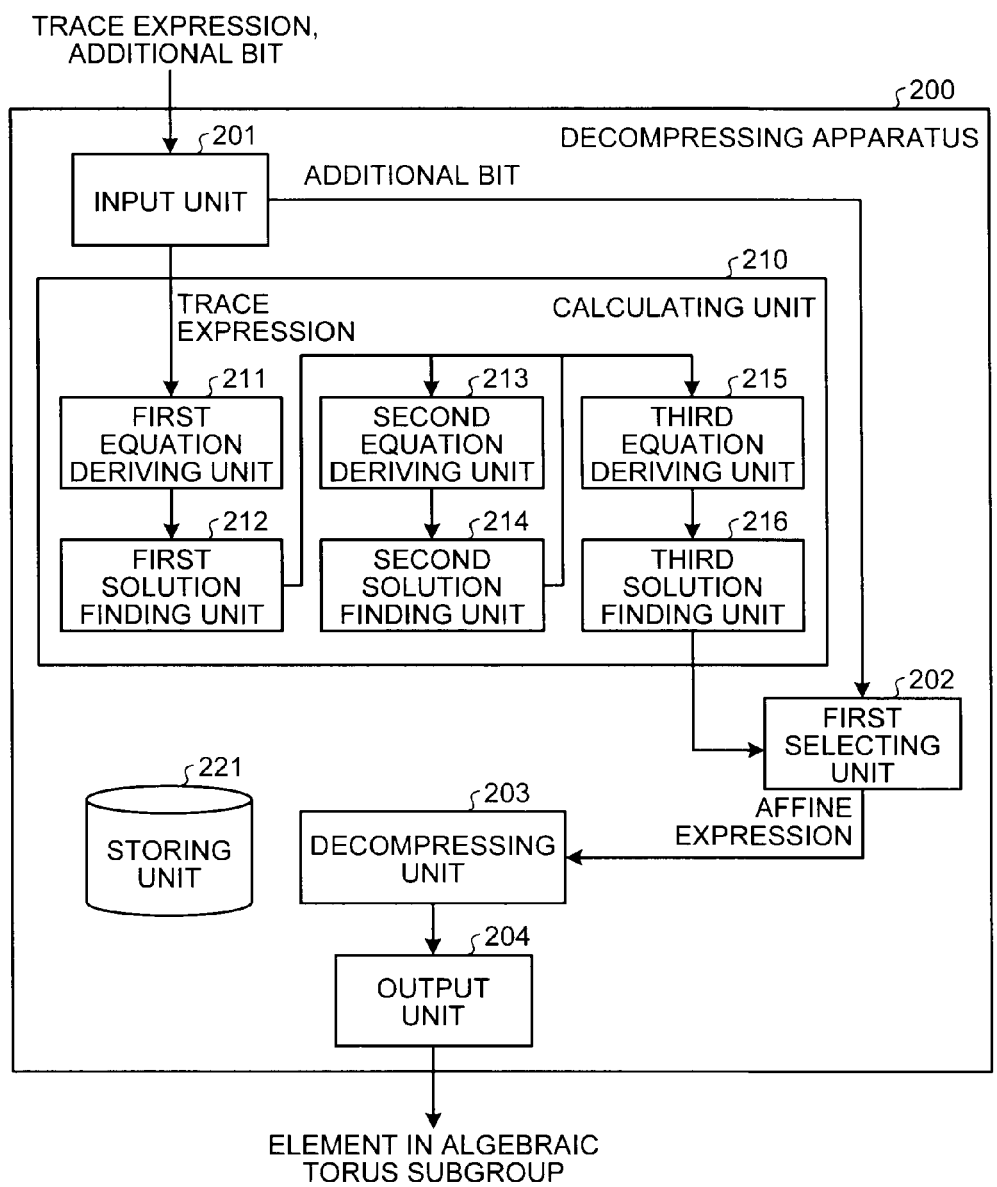
FIG. 3 is a block diagram of a decompressing apparatus according to the first embodiment.

FIG. 3 is a block diagram illustrating an exemplary structure of the decompressing apparatus 200 according to the first embodiment. As illustrated in FIG. 3, the decompressing apparatus 200 comprises an input unit 201, a calculating unit 210, a first selecting unit 202, a decompressing unit 203, an output unit 204 and a storing unit 221.

The input unit 201 inputs the trace expression and the additional bit output from the compressing apparatus 100. The calculating unit 210 derives the multivariable simultaneous equations from the input trace expression and calculates the solutions of the multivariable simultaneous equations. The calculating unit 210 comprises a first equation deriving unit 211, a first solution finding unit 212, a second equation deriving unit 213, a second solution finding unit 214, a third equation deriving unit 215 and a third solution finding unit 216.

The first equation deriving unit 211 derives the first equation obtained by inputting the input trace expression data into a preset coefficient in a previously-found $k_1$-th ($k_1$ is a preset integer of 1 or more) degree equation over the finite field Fq. An example in which the first equation as a quadric equation ($k_1=2$) is derived will be described below. The first solution finding unit 212 finds the solutions of the first equation.

The second equation deriving unit 213 derives the second equation obtained by inputting at least one of the solutions found by the first solution finding unit 212 into a preset coefficient in a previously-found $k_2$-th ($k_2$ is a preset integer of 1 or more) degree equation over the finite field Fq. An example in which the second equation as a cubic equation ($k_2=3$) is derived will be described below. The second solution finding unit 214 finds the solutions of the second equation.

The third equation deriving unit 215 derives the third equation obtained by inputting at least one of the solutions found by the first solution finding unit 212 and the solutions found by the second solution finding unit 214 into a preset coefficient in a previously-found $k_3$-th ($k_3$ is a preset integer of 1 or more) degree equation over the finite field Fq. An example in which the third equation as a linear equation ($k_3=1$) is derived will be described below. The third solution finding unit 216 finds the solutions of the third equation.

The first selecting unit 202 finds a plurality of affine expressions from the plurality of solutions calculated by the calculating unit 210 and selects any affine expression corresponding to the additional data from among the found affine expressions. The decompressing unit 203 decompresses the selected affine expression to the element in the algebraic torus subgroup before the compression. The decompressing unit 203 transforms the affine expression into the pre-compression element by the affine transform inverse map $Af^{-1}$. The output unit 204 outputs the decompressed element in the algebraic torus subgroup.

The storing unit 221 stores information for finding previously-derived equations used for deciding the additional bit as the storing unit 121 in the compressing apparatus 100 does. The storing unit 121 and the storing unit 221 may be configured of any generally-used storage medium such as HDD (Hard Disk Drive), optical disk, memory card or RAM (Random Access Memory).

Figure 4:
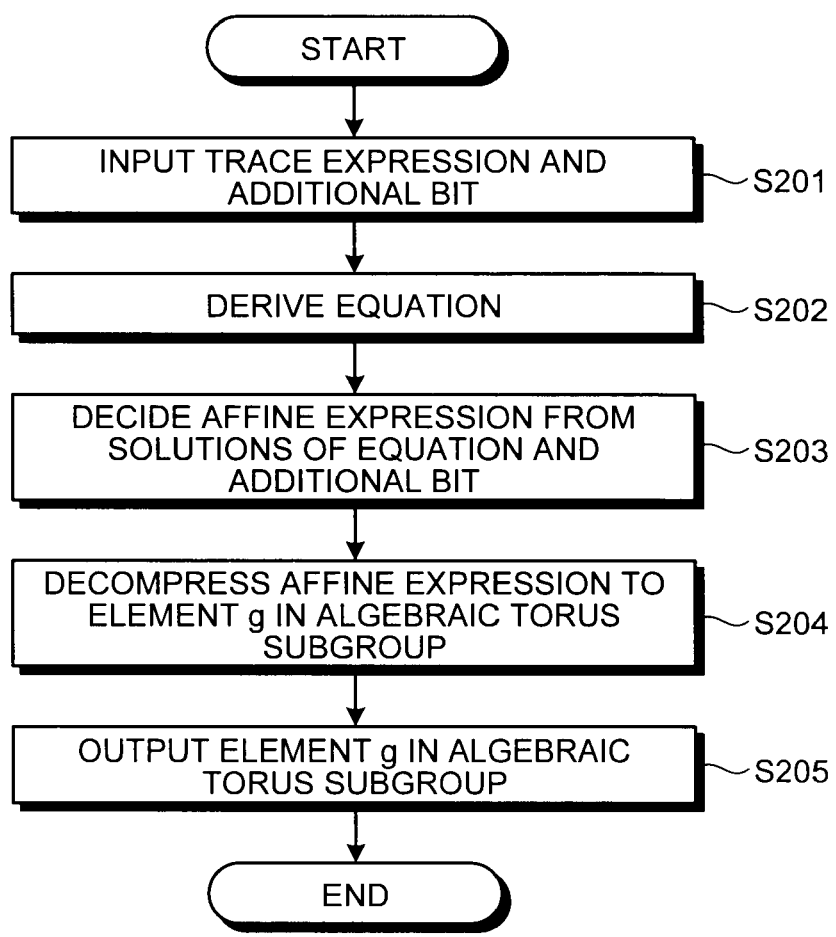
FIG. 4 is a flowchart of decompression processing according to the first embodiment.

Decompression processing by the decompressing apparatus 200 with the above structure according to the first embodiment will be described with reference to FIG. 4. FIG. 4 is a flowchart illustrating a flow of the entire decompression processing in the first embodiment.

The input unit 201 inputs the trace expression $T \in Fq$ and the additional bit $j \in F2^3$ (step S201). The calculating unit 210 derives the multivariable simultaneous equations from the input trace expression and calculates the solutions of the multivariable simultaneous equations (step S202). The calculation processing by the calculating unit 210 will be detailed below.

The first selecting unit 202 selects (decides) the affine expression based on the calculated solutions and the input additional bit (step S203). The decompressing unit 203 decompresses the affine expression to the element g in the algebraic torus subgroup (step S204). The output unit 204 outputs the element g in the algebraic torus subgroup which is obtained by the decompression (step S205).

The calculation processing by the calculating unit 210 in step S202 will be detailed below.

First, the first equation deriving unit 211 derives the quadric equation A(x) expressed in the equation (3) (step S202).

$$A(x): x^2 + (T^{t-2}+1)^{-1} = 0 \text{ over } Fq \quad (3)$$

The first equation deriving unit 211 reads the information for finding the above A(x) from the storing unit 221, for example. The information contains relationships between coefficients and variables and information for specifying a preset coefficient for inputting the trace expression. The first equation deriving unit 211 inputs the trace expression input into the preset coefficient to decide A(x) with reference to the information. The first equation deriving unit 211 sends the decided A(x) to the first solution finding unit 212.

Assuming that a desired affine expression is $(\alpha+1, \beta+1, \gamma+1)$, the quadric equation A(x) has the root of $\alpha+\beta+\gamma$. A procedure of deriving the quadric equation A(x) will be described later.

When A(x) is input, the first solution finding unit 212 uses the Berlekamp algorithm or the like to factorize A(x) over Fq, and consequently finds the solutions a1 and a2 for A(x)=0. The first solution finding unit 212 sends the found solutions a1 and a2 to the second equation deriving unit 213 and the third equation deriving unit 215.

When the solutions a1 and a2 are input, the second equation deriving unit 213 derives the cubic equations B(x) and C(x) expressed by the equations (4) and (5).

$$B(x): x^3 - a1 \times x^2 - (a1^2-1)x - Z(a1) = 0 \text{ over } Fq \quad (4)$$

$$C(x): x^3 - a2 \times x^2 - (a2^2-1)x - Z(a2) = 0 \text{ over } Fq \quad (5)$$

where $Z(x) = x^3 - Y(x) + (x \times Y(x) - Y(x)^2 - 1)/x^3$ over Fq and $Y(x) = (-1-x^2)/x^t - x$ over Fq.

The second equation deriving unit 213 sends B(x) and C(x) to the second solution finding unit 214.

Assuming that a desired affine expression is $(\alpha+1, \beta+1, \gamma+1)$, one of the cubic equations has the root of $\beta$. Procedures of deriving the cubic equations B(x) and C(x) will be described later.

When B(x) and C(x) are input, the second solution finding unit 214 uses the Berlekamp algorithm or the like to factorize B(x) and C(x) over Fq, and consequently finds the solutions b1, b2, b3 for B(x)=0 and the solutions c1, c2, c3 for C(x)=0. The second solution finding unit 214 sends the solutions (b1, b2, b3) and (c1, c2, c3) to the third equation deriving unit 215.

When (a1, a2), (b1, b2, b3) and (c1, c2, c3) are input, the third equation deriving unit 215 derives the linear equations D(x), E(x), F(x), G(x), H(x) and I(x) expressed in the equations (6) to (11).

$$D(x): (-b1^{\{2\}} + (a1+(1/a1)) \times b1) \times x + Z(a1) + (-a1+(1/a1)) \times b1^2 - (Y(a1)/a1) \times b1 = 0 \text{ over } Fq \quad (6)$$

$$E(x): (-b2^{\{2\}} + (a1+(1/a1)) \times b2) \times x + Z(a1) + (-a1+(1/a1)) \times b2^2 - (Y(a1)/a1) \times b2 = 0 \text{ over } Fq \quad (7)$$

$$F(x): (-b3^{\{2\}} + (a1+(1/a1)) \times b3) \times x + Z(a1) + (-a1+(1/a1)) \times b3^2 - (Y(a1)/a1) \times b3 = 0 \text{ over } Fq \quad (8)$$

$$G(x): (-c1^{\{2\}} + (a2+(1/a2)) \times c1) \times x + Z(a2) + (-a2+(1/a2)) \times c1^2 - (Y(a2)/a2) \times c1 = 0 \text{ over } Fq \quad (9)$$

$$H(x): (-c2^{\{2\}} + (a2+(1/a2)) \times c2) \times x + Z(a2) + (-a2+(1/a2)) \times c2^2 - (Y(a2)/a2) \times c2 = 0 \text{ over } Fq \quad (10)$$

$$I(x): (-c3^{\{2\}} + (a2+(1/a2)) \times c3) \times x + Z(a2) + (-a2+(1/a2)) \times c3^2 - (Y(a2)/a2) \times c3 = 0 \text{ over } Fq \quad (11)$$

The third equation deriving unit 215 sends D(x), E(x), F(x), G(x), H(x) and I(x) to the third solution finding unit 216.

Assuming that a desired affine expression is $(\alpha+1, \beta+1, \gamma+1)$, one of the linear equations has the root of $\gamma$. Procedures of deriving the linear equations D(x), E(x), F(x), G(x), H(x) and I(x) will be described later.

When D(x)=0, E(x)=0, F(x)=0, G(x)=0, H(x)=0 and I(x)=0 are input, the third solution finding unit 216 finds the solutions d, e, f, g, h and i. The third solution finding unit 216 sends six combinations of solutions (a1–b1–d, b1, d), (a1–b2–e, b2, e), (a1–b3–f, b3, f), (a2–c1–g, c1, g), (a2–c2–h, c2, h) and (a2–c3–i, c3, i) from the above solutions and the solutions b1, b2, b3, c1, c2, c3 of the cubic equations B(x) and C(x) to the first selecting unit 202.

When the six combinations of solutions and the additional bit j ($1 \le j \le 6$) are received, the first selecting unit 202 calculates (a1−b1−d+1, b1+1, d+1), (a1−b2−e+1, b2+1, e+1), (a1−b3−f+1, b3+1, f+1), (a2−c1−g+1, c1+1, g+1), (a2−c2−h+1, c2+1, h+1) and (a2−c3−i+1, c3+1, i+1), each element in the six combinations of solutions being added with 1. The first selecting unit 202 arranges the calculated six solutions according to a predetermined rule. The solutions are arranged in descending order in the following, but the rule is not limited to that.

The first selecting unit 202 selects the j-th largest value from among the six arranged solutions. The value corresponds to the desired affine expression. The first selecting unit 202 sends the selected value (affine expression) to the decompressing unit 203.

The decompressing unit 203 transforms the received affine expression into the finite field expression of the algebraic torus subgroup by the affine transform inverse map $Af^{-1}$, and outputs the finite field expression.

In this way, the compressing apparatus and the decompressing apparatus according to the first embodiment can be efficiently realized for the modulus polynomials which cannot efficiently configure a decompressed map in the conventional method. In the compressing apparatus and the decompressing apparatus according to the present embodiment, $Tr(g')$ can be calculated not by decompressing the trace expression $Tr(g)$ but by operating the additional bit by use of the property that the trace expressions $Tr(g)$ and $Tr(g')$ are identical for a certain element g over the algebraic torus subgroup and an element g' obtained by calculating a Frobenius map.

Second Embodiment

A decompressing apparatus according to a second embodiment uses part of additional bits to narrow equations to be solved. Thus, compression and decompression can be more efficiently performed. The structure of algebraic torus is the same as that of the first embodiment and thus an explanation thereof will be omitted.

(1) Structure of Compressing Apparatus

Figure 5:
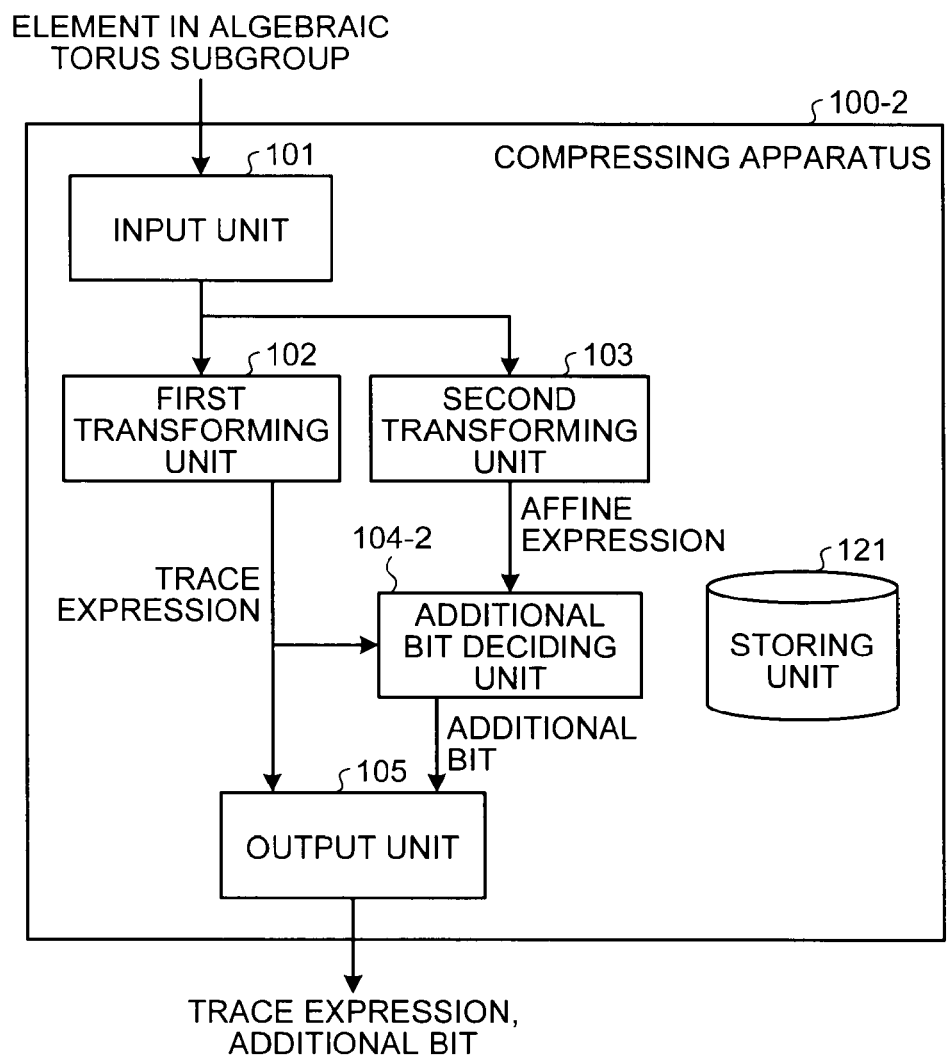
FIG. 5 is a block diagram of a compressing apparatus according to a second embodiment.

FIG. 5 is a block diagram illustrating an exemplary structure of a compressing apparatus 100-2 according to the second embodiment. As illustrated in FIG. 5, the compressing apparatus 100-2 comprises the input unit 101, the first transforming unit 102, the second transforming unit 103, an additional bit deciding unit 104-2, the output unit 105 and the storing unit 121.

The second embodiment is different from the first embodiment in the function of the additional bit deciding unit 104-2. Other structures and functions are the same as those of the compressing apparatus 100 according to the first embodiment illustrated in the block diagram of FIG. 1, and thus are denoted by the same reference numerals as those in FIG. 1 and an explanation thereof will be omitted.

Additional bit decision processing by the additional bit deciding unit 104-2 according to the second embodiment will be described below.

When the first transforming unit 102 and the second transforming unit 103 calculate the trace expression $Tr(g)$ and the affine expression $(\alpha+1, \beta+1, \gamma+1)$ (step S102, step S103 in FIG. 2), the additional bit deciding unit 104-2 solves a quadric equation derived based on the conditions for the trace expression and the algebraic torus and the condition for the finite field, thereby finding the solutions a1 and a2. The additional bit deciding unit 104-2 rearranges the found solutions a1 and a2 in descending order, and decides i1 (i1=1 or 2) coincident with the sum of elements in the affine expression of g, $\alpha+\beta+\gamma+3$ over Fq as the additional bit 1.

Then, the additional bit deciding unit 104-2 derives the cubic equation based on the trace expression, the sums of elements in the affine expression, the condition for the torus, and the condition for the finite field. The additional bit deciding unit 104-2 derives the linear equation based on the solutions of the cubic equation and finds three candidates for the affine expression. The additional bit deciding unit 104-2 arranges the found candidates in descending order, compares them with the affine expression of g, and when the candidate coincides with i2-th ($1 \leq i2 \leq 3$) element, decides i2 as the additional bit 2. The output unit 105 outputs the additional bits i1 and i2 together with the trace expression.

The methods for deriving the quadric equation, the cubic equation and the linear equation and finding their solutions can be realized in the same structure as that of a decompressing apparatus 200-2 described below.

(2) Structure of Decompressing Apparatus

Figure 6:
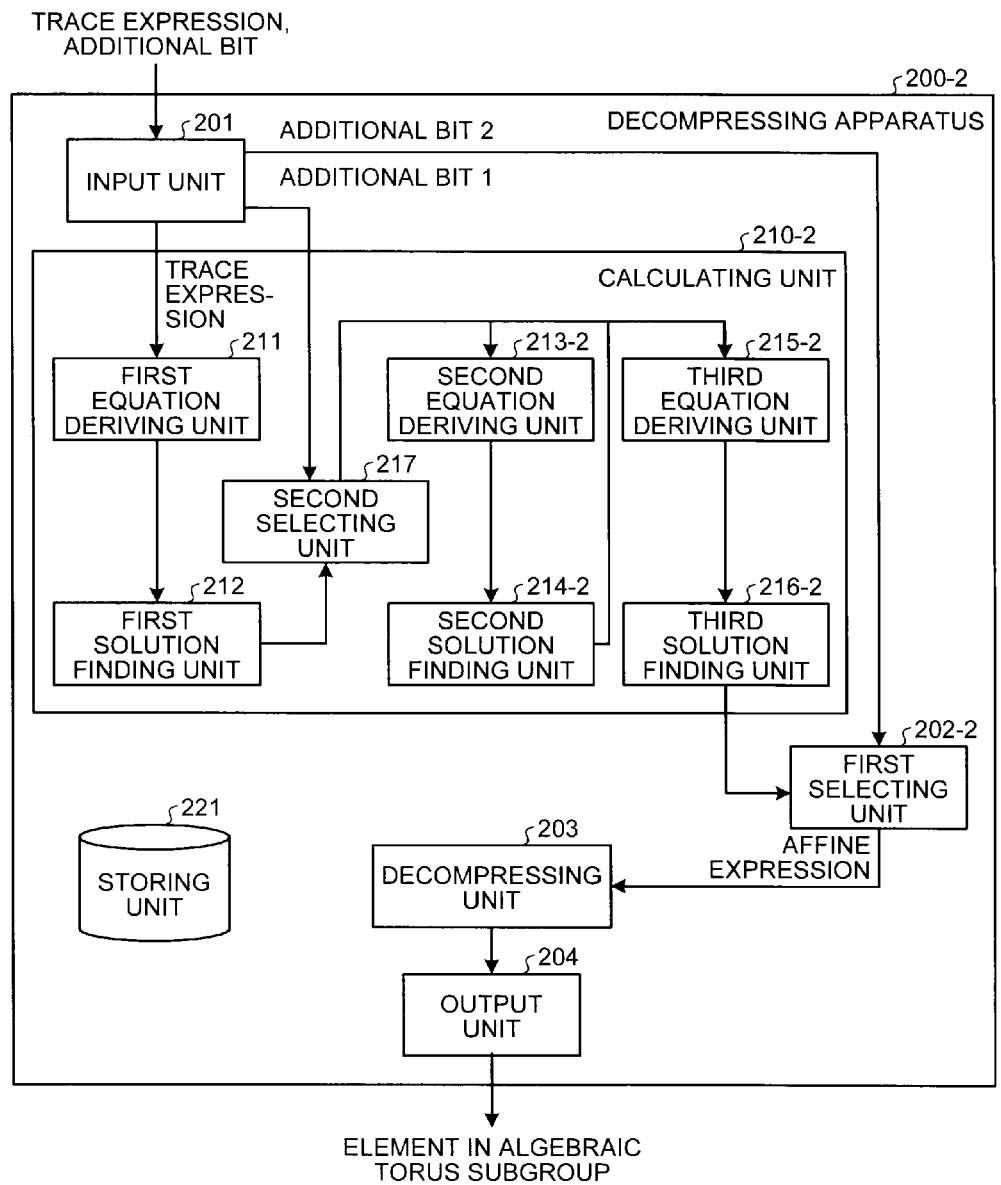
FIG. 6 is a block diagram of a decompressing apparatus according to the second embodiment.

FIG. 6 is a block diagram illustrating an exemplary structure of the decompressing apparatus 200-2 according to the second embodiment. As illustrated in FIG. 6, the decompressing apparatus 200-2 comprises the input unit 201, a calculating unit 210-2, a first selecting unit 202-2, the decompressing unit 203, the output unit 204 and the storing unit 221.

The second embodiment is different from the first embodiment in the functions of the calculating unit 210-2 and the first selecting unit 202-2. The other structures and functions are the same as those of the decompressing apparatus 200 according to the first embodiment illustrated in the block diagram of FIG. 3, and thus are denoted by the same reference numerals and an explanation thereof will be omitted.

The calculating unit 210-2 further comprises a second selecting unit 217. The functions of the first equation deriving unit 211 and the first solution finding unit 212 are the same as those in the first embodiment, and thus are denoted by the same reference numerals and an explanation thereof will be omitted.

The second selecting unit 217 uses the additional bit 1 (i1) among the input additional bits to select the i1-th solution when the solutions obtained by the first solution finding unit 212 are arranged in descending order.

The second equation deriving unit 213-2 uses the solution selected by the second selecting unit 217 to derive the second equation. The second solution finding unit 214-2 finds the solutions of the second equation. The third equation deriving unit 215-2 derives the third equation obtained by inputting at least one of the solution selected by the second selecting unit 217 and the solutions found by the second solution finding unit 214-2. The third solution finding unit 216-2 finds the solutions of the third equation.

The first selecting unit 202-2 is different from the first selecting unit 202 according to the first embodiment in that the additional data i2 among the items of additional data is used to select a solution.

Calculation processing by the calculating unit 210-2 according to the second embodiment will be described below in detail.

When the trace expression $T \in Fq$ and the additional bit (i1, i2)$\in F2 \times F2^2$ are input, the input unit 201 sends the trace expression T to the first equation deriving unit 211. The first equation deriving unit 211 derives the quadric equation $A(x)$ by the above processing, and sends it to the first solution finding unit 212. The first solution finding unit 212 factorizes $A(x)$ over Fq to find the solutions a1 and a2 for $A(x)=0$, and sends the solutions a1 and a2 to the second selecting unit 217.

When the solutions a1, a2 and the additional bit 1(i1) are input, the second selecting unit 217 arranges the solutions a1 and a2 in descending order, selects the i1-th element as a and sends it to the second equation deriving unit 213-2 and the third equation deriving unit 215-2.

When the solution a is input, the second equation deriving unit 213-2 derives the cubic equation B(x) expressed in the equation (12). Z(x) and Y(x) are as noted above.

$$B(x){:}x^3-a{\times}x^2-(a^2-1)x-Z(a)=0 \text{ over } Fq \tag{12}$$

The second equation deriving unit 213-2 sends B(x) to the second solution finding unit 214-2. When B(x) is input, the second solution finding unit 214-2 uses the Berlekamp algorithm or the like to factorize B(x) over Fq, and consequently finds the solutions b1, b2 and b3 for B(x)=0. The second solution finding unit 214-2 sends the solution (b1, b2, b3) to the third equation deriving unit 215-2.

When (a) and (b1, b2, b3) are input, the third equation deriving unit 215-2 derives the linear equations D(x), E(x) and F(x) expressed in the equations (13) to (15).

$$D(x){:}(-b1^2+(a+(1/a)){\times}b1){\times}x+Z(a)+(-a+(1/a)){\times}b1^2-(Y(a)/a){\times}b1=0 \text{ over } Fq \tag{13}$$

$$E(x){:}(-b2^2+(a+(1/a)){\times}b2){\times}x+Z(a)+(-a+(1/a)){\times}b2^2-(Y(a)/a){\times}b2=0 \text{ over } Fq \tag{14}$$

$$F(x){:}(-b3^2+(a+(1/a)){\times}b3){\times}x+Z(a)+(-a+(1/a)){\times}b3^2-(Y(a)/a){\times}b3=0 \text{ over } Fq \tag{15}$$

The third equation deriving unit 215-2 sends the linear equations D(x), E(x) and F(x) to the third solution finding unit 216-2.

When D(x)=0, E(x)=0 and F(x)=0 are input, the third solution finding unit 216-2 finds their solutions d, e and f. The third solution finding unit 216-2 sends three combinations of solutions (a−b1−d, b1, d), (a−b2−e, b2, e) and (a−b3−f, b3, f) to the first selecting unit 202-2.

When the three solutions and the additional bit i2 (1≤i2≤3) are received, the first selecting unit 202-2 calculates (a−b1−d+1, b1+1, d+1), (a−b2−e+1, b2+1, e+1) and (a−b3−f+1, b3+1, f+1), each element in the three combinations of solutions being added with 1. The first selecting unit 202-2 arranges the three calculated solutions in descending order. The first selecting unit 202-2 selects the i2-th largest solution among the three arranged solutions. The value corresponds to the desired affine expression. The first selecting unit 202-2 sends the selected value (affine expression) to the decompressing unit 203. The decompressing unit 203 transforms the received affine expression into the finite field expression of the algebraic torus subgroup and outputs the resulting finite field expression.

In this way, the compressing apparatus and the decompressing apparatus according to the second embodiment can separately calculate the additional bits i1 and i2 and can use the additional bit i1 to early narrow the equations to be solved. Thereby, the compression and the decompression can be more efficiently performed.

Third Embodiment

In a third embodiment, an example in which the same method as that of the first embodiment is applied to the compression at the compression rate of 1/4 will be described.

(1) Structure of Algebraic Torus

Consider a finite field Fq with q≡2 (mod 5), q=2^n and p|(√(2q)). And consider a fourth degree extension field Fq4 of the finite field Fq by use of the modulus polynomial $\Phi 5=x^4+x^3+x^2+x+1$. In this case, $x^q=x^2$, $x^{q^2}=x^4$, $x^{q^3}=x^3$, and $x^{q^4}=x$ are established over Fq4.

At this time, the algebraic torus T4(Fq) over the fourth degree extension field Fq4 has a subgroup with the order of q−√(2q)+1. Herein, n is an odd number from q≡2 (mod 5) and thus √(2q) is an integer. Here, it is assumed √(2q)=t. The trace map Tr:Fq4→Fq is defined in the equation (16).

$$Tr(g)=g+g^q+g^{q^2}+g^{q^3} \tag{16}$$

The affine transform map Af:Fq4→Fq2 and the affine transform inverse map Af^{−1}:Fq2→Fq4 are defined in the equation (17).

$$Af(g)=(G+1)/G2{\in}Fq2,$$

$$Af^{-1}(Af(g))=(Af(g)+z)/(Af(g)+z^q){\in}Fq4 \tag{17}$$

where $z{:}{=}x+x^q=x+x^2$ and $g{:}{=}a0+a1{\times}x+a2{\times}x^2+a3{\times}x^3=(a0+a3{\times}x^3)+(a1{\times}x+a2{\times}x^2)=G1+G2{\times}z$ (where, G1, G2∈Fq).

(2) Structure of Compressing Apparatus

Figure 7:
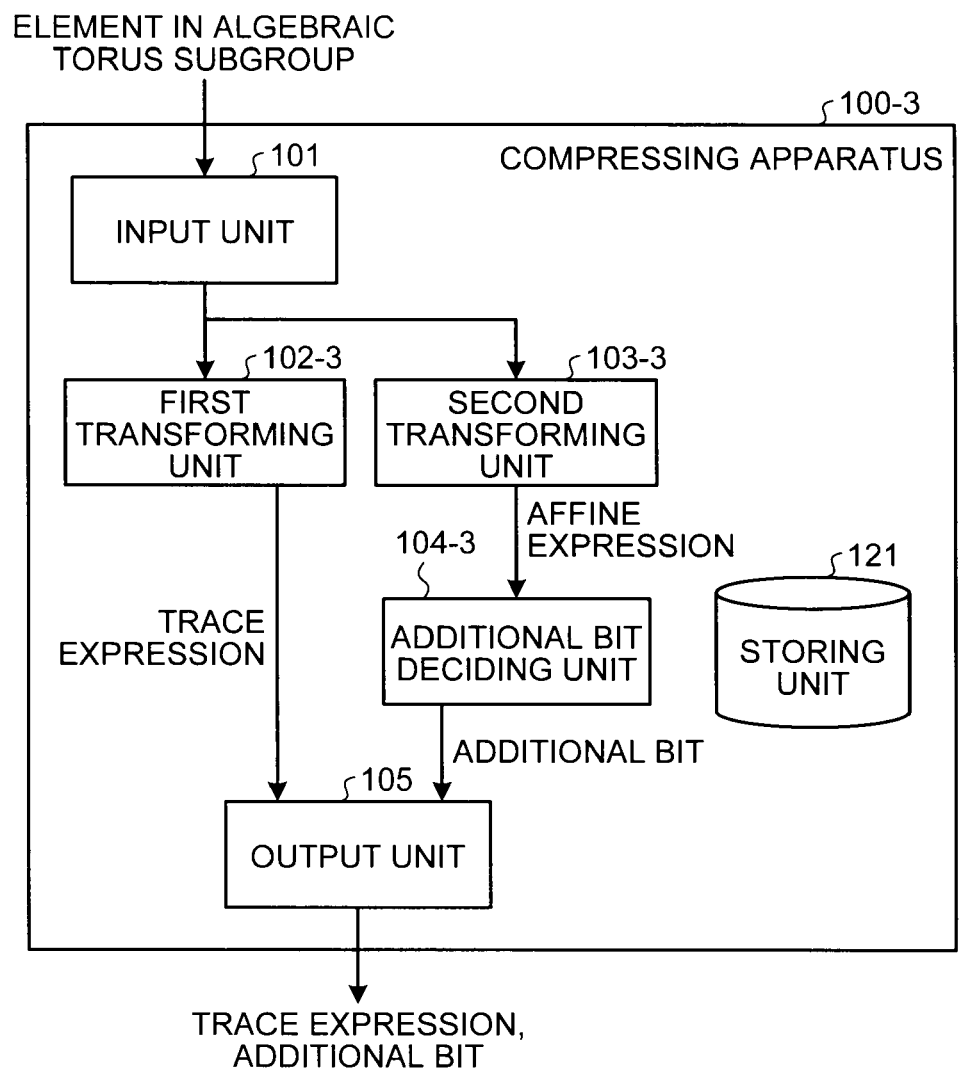
FIG. 7 is a block diagram of a compressing apparatus according to a third embodiment.

FIG. 7 is a block diagram illustrating an exemplary structure of a compressing apparatus 100-3 according to a third embodiment. As illustrated in FIG. 7, the compressing apparatus 100-3 comprises the input unit 101, a first transforming unit 102-3, a second transforming unit 103-3, an additional bit deciding unit 104-3, the output unit 105 and the storing unit 121. The constituents having the same functions as those of the first embodiment are denoted by the same reference numerals as those in FIG. 1 and an explanation thereof will be omitted.

The first transforming unit 102-3 transforms the element g input from the trace map Tr in the equation (16) into the trace expression Tr(g). The second transforming unit 103-3 transforms the element g input from the affine transform map Af in the equation (17) into the affine expression (α, β)∈Fq×Fq. The additional bit deciding unit 104-2 decides the least significant bit of α as the additional bit 1 and the least significant bit of β as the additional bit 2.

(3) Structure of Decompressing Apparatus

Figure 8:
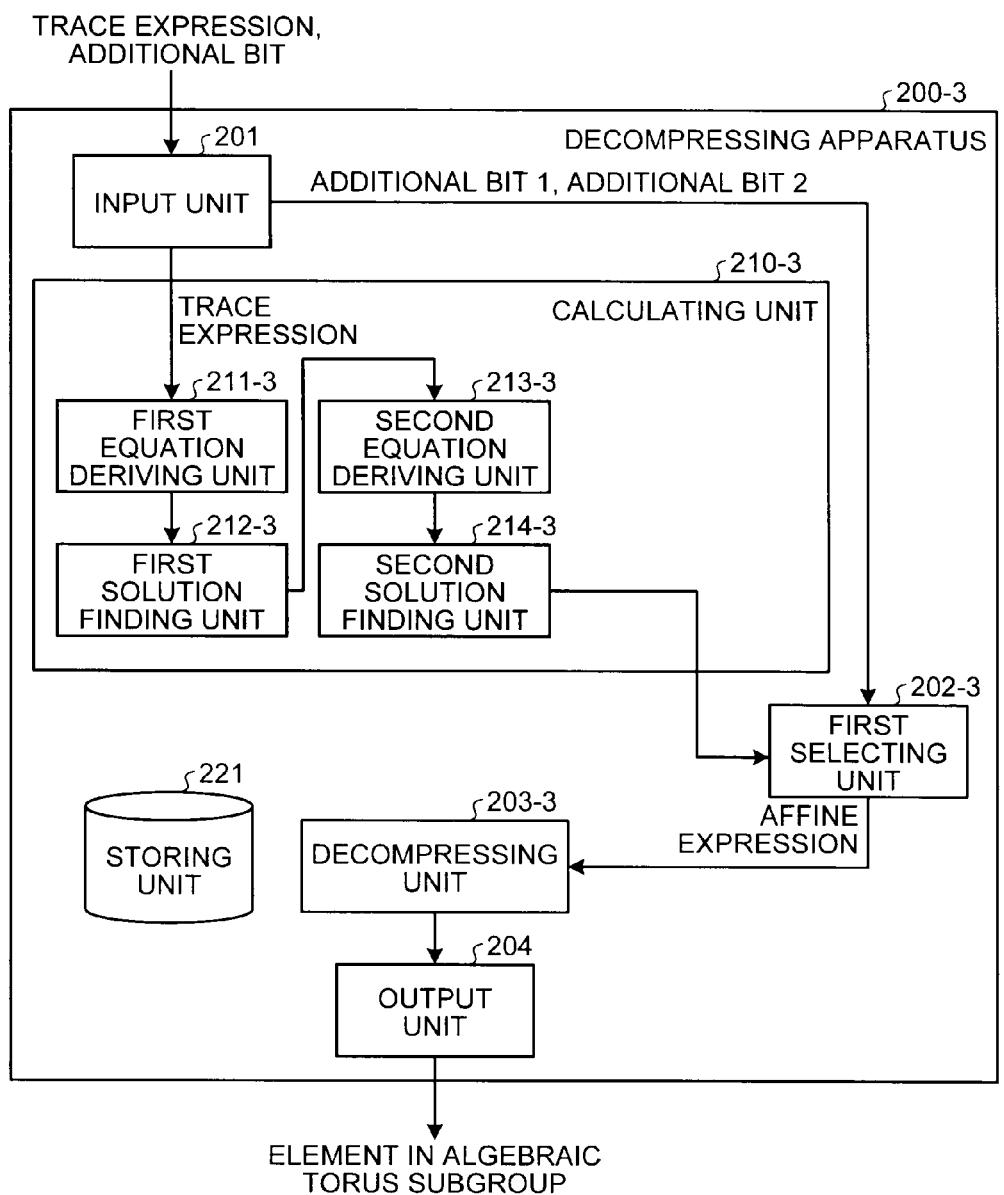
FIG. 8 is a block diagram of a decompressing apparatus according to the third embodiment.

FIG. 8 is a block diagram illustrating an exemplary structure of a decompressing apparatus 200-3 according to the third embodiment. As illustrated in FIG. 8, the decompressing apparatus 200-3 comprises the input unit 201, a calculating unit 210-3, a first selecting unit 202-3, a decompressing unit 203-3, the output unit 204 and the storing unit 221. The constituents having the same functions as those of the first embodiment are denoted by the same reference numerals as those in FIG. 3 and an explanation thereof will be omitted.

The calculating unit 210-3 comprises a first equation deriving unit 211-3, a first solution finding unit 212-3, a second equation deriving unit 213-3 and a second solution finding unit 214-3.

The first equation deriving unit 211-3 derives the first equation as a different quadric equation from the first embodiment. The first solution finding unit 212-3 finds the solutions of the first equation. The second equation deriving unit 213-3 derives the second equation as a quadric equation, unlike the first embodiment. The second solution finding unit 214-3 finds the solutions of the second equation. The first selecting unit 202-3 selects any solution corresponding to the additional data from among the solutions calculated by the calculating unit 210-3.

Now, the calculation processing by the calculating unit 210-3 according to the third embodiment will be described in detail.

When the trace expression T∈Fq and the additional bits (i1, i2)∈F2×F2 are input, the first equation deriving unit 211-3 derives the quadric equation A(x) expressed in the equation (18) and sends it to the first solution finding unit 212-3.

$$A(x){:}x^2+x+1-T^{q-t}=0 \text{ over } Fq \tag{18}$$

When A(x) is input, the first solution finding unit 212-3 uses the Berlekamp algorithm or the like to factorize A(x) over Fq and to find the solutions a1 and a2 for A(x)=0, and sends the solutions a1 and a2 to the second equation deriving unit 213-3. The first solution finding unit 212-3 may transform the term of x^2 into a linear term by using a Frobenius map, thereby solving the transformed linear equation.

When the solutions a1 and a2 are input, the second equation deriving unit 213-3 derives the quadric equations $B(x)$ and $C(x)$ expressed in the equations (19) and (20) and sends them to the second solution finding unit 214-3.

$$B(x): x^2+x+a1^2+a1\char`\^t\times T\char`\^\{q-t\}=0 \text{ over } Fq \qquad (19)$$

$$C(x): x^2+x+a2^2+a2\char`\^t\times T\char`\^\{q-t\}=0 \text{ over } Fq \qquad (20)$$

When $B(x)$ and $C(x)$ are input, the second solution finding unit 214-3 uses the Berlekamp algorithm or the like to factorize $B(x)$ and $C(x)$ over Fq, thereby finding the solutions b1 and b2 for $B(x)=0$ and the solutions c1 and c2 for $C(x)=0$. The second solution finding unit 214-3 sends the solutions b1, b2, c1 and c2 to the first selecting unit 202-3.

When the solutions b1, b2, c1, c2, the additional bit 1 and the additional bit 2 are received, the first selecting unit 202-3 finds four combinations of solutions (a1–b1, b1), (a1–b2, b2), (a2–c1, c1) and (a2–c2, c2). The first selecting unit 202-3 compares the least significant bit of the first component in each combination (a1–b1, a1–b2, a2–c1, a2–c2) with the additional bit 1, compares the least significant bit of the second component in each combination (b1, b2, c1, c2) with the additional bit 2, and selects the coincident pair. The value of the pair corresponds to the desired affine expression. The first selecting unit 202-3 sends the selected value (affine expression) to the decompressing unit 203-3. The decompressing unit 203-3 transforms the received affine expression into the finite filed expression of the algebraic torus subgroup and outputs it.

In this way, the third embodiment can realize the compression at the compression rate of 1/4 and the decompression similar to the first embodiment.

Fourth Embodiment

In a fourth embodiment, an example in which the same method as that of the second embodiment is applied to the compression at the compression rate of 1/4 will be described. The structure of the algebraic torus is the same as that of the third embodiment and thus an explanation thereof will be omitted. A compressing apparatus according to the fourth embodiment is the same as the compressing apparatus 100-3 according to the third embodiment.

(1) Structure of Decompressing Apparatus

Figure 9:
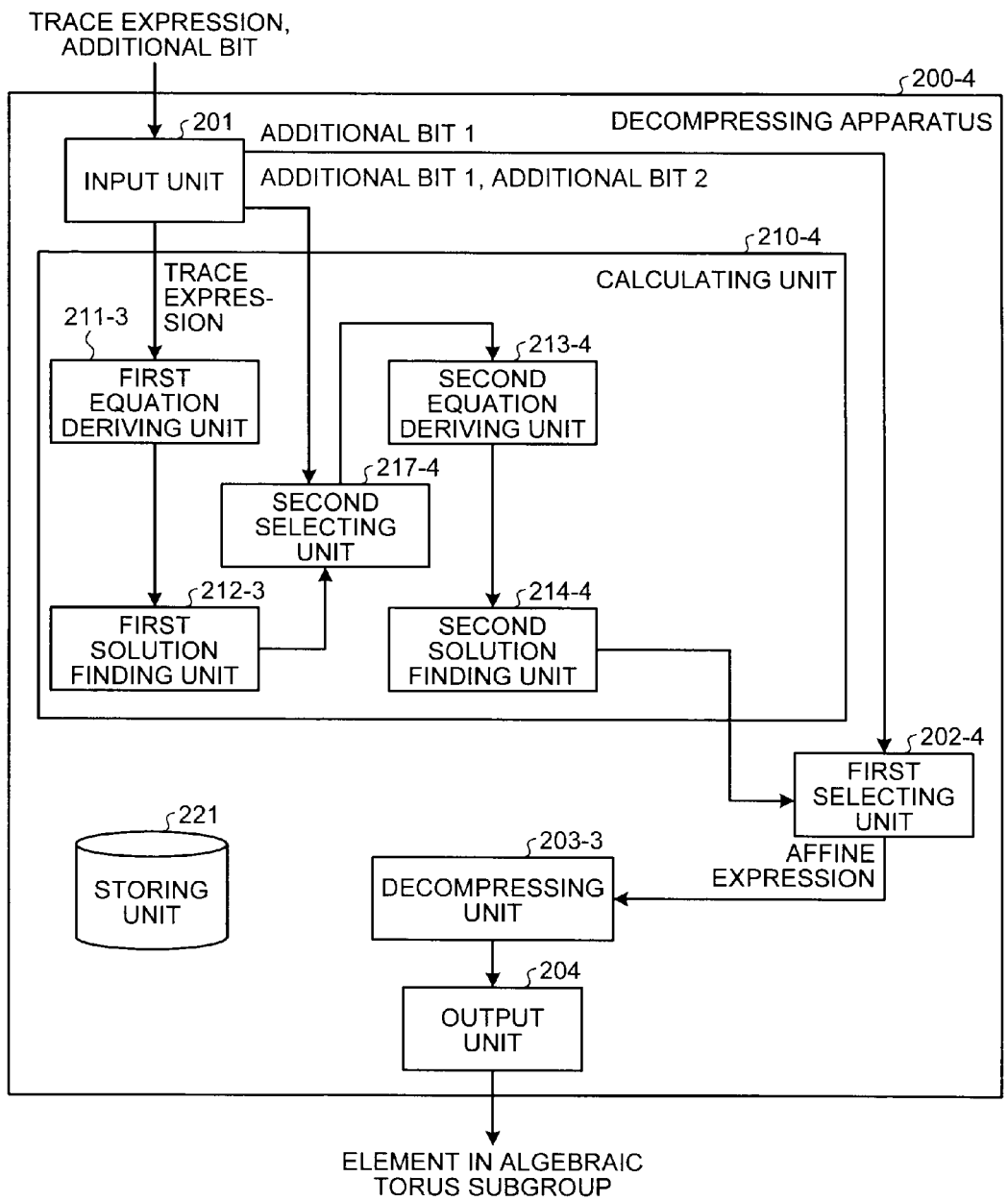
FIG. 9 is a block diagram of a decompressing apparatus according to a fourth embodiment.

FIG. 9 is a block diagram illustrating an exemplary structure of a decompressing apparatus 200-4 according to the fourth embodiment. As illustrated in FIG. 9, the decompressing apparatus 200-4 comprises the input unit 201, a calculating unit 210-4, a first selecting unit 202-4, a decompressing unit 203-3, the output unit 204 and the storing unit 221. The constituents having the same functions as those of the third embodiment are denoted by the same reference numerals as those in FIG. 8 and an explanation thereof will be omitted. The calculating unit 210-4 comprises a first equation deriving unit 211-3, the first solution finding unit 212-3, a second selecting unit 217-4, a second equation deriving unit 213-4 and a second solution finding unit 214-4.

The second selecting unit 217-4 uses the additional bit 1(i1) and the additional bit 2(i2) among the input additional bits to compare the least significant bit of the solutions obtained by the first solution finding unit 212-3 with the sum of the additional bit 1(i1) and the additional bit 2(i2) over F2, thereby selecting the coincident solution. The second equation deriving unit 213-4 uses the solution selected by the second selecting unit 217-4 to decide the second equation. The second solution finding unit 214-4 finds the solutions of the second equation.

The calculation processing by the calculating unit 210-4 according to the fourth embodiment will be described below in detail.

When the trace expression $T \in Fq$ and the additional bits (i1, i2)$\in$F2$\times$F2 are input, the first equation deriving unit 211-3 derives the quadric equation $A(x)$ expressed in the equation (18) and sends it to the first solution finding unit 212-3.

When $A(x)$ is input, the first solution finding unit 212-3 uses the Berlekamp algorithm or the like to factorize $A(x)$ over Fq, thereby finding the solutions a1 and a2 for $A(x)=0$. The first solution finding unit 212-3 sends the solutions a1 and a2 to the second selecting unit 217-4. A Frobenius map may be used to transform the term of x^2 into a linear term to solve the transformed linear equation.

When the solutions a1, a2, the additional bit 1(i1) and the additional bit 2(i2) are input, the second selecting unit 217-4 compares the sum of the additional bit 1(i1) and the additional bit 2(i2) over F2 with the least significant bit of the solutions a1, a2, and selects the coincident solution as the solution a. The second selecting unit 217-4 sends the selected solution a to the second equation deriving unit 213-4.

When the solution a is input, the second equation deriving unit 213-4 derives the quadric equation $B(x)$ expressed in the equation (21) and sends it to the second solution finding unit 214-4.

$$B(x): x^2+x+a^2+a\char`\^t\times T\char`\^\{q-t\}=0 \text{ over } Fq \qquad (21)$$

When $B(x)$ is input, the second solution finding unit 214-4 uses the Berlekamp algorithm or the like to factorize $B(x)$ over Fq, thereby finding the solutions b1 and b2 for $B(x)=0$. The second solution finding unit 214-4 sends the solutions b1 and b2 to the first selecting unit 202-4.

When the solutions b1, b2 and the additional bit 2(i2) are received, the first selecting unit 202-4 compares the additional bit 2(i2) with the least significant bit of the solutions b1, b2, and selects the coincident solution as the solution b. The first selecting unit 202-4 sends (a–b, b)$\in$Fq$\times$Fq obtained from the solutions a and b to the decompressing unit 203-3. (a–b, b) corresponds to the desired affine expression.

The first selecting unit 202-4 may be configured to find two combinations of solutions (a–b1, b1) and (a–b2, b2) and to select a combination of solutions whose second component coincides with the additional bit 2(i2) (=the desired affine expression).

The decompressing unit 203-3 transforms the received affine expression into the finite field expression of the algebraic torus subgroup and outputs it.

In this way, the fourth embodiment can realize the compression at the compression rate of 1/4 and the decompression similar to the second embodiment.

The compressing apparatus and the decompressing apparatus according to each of the above embodiments can be provided inside an apparatus for encoding and decoding a public key encryption, for example. For example, the compressing apparatus may be provided in an information processing apparatus (encoding apparatus) for transmitting the data encoded by the public key encryption and the decompressing apparatus may be provided in an information processing apparatus (decoding apparatus) for receiving and decoding the encoded data. A compressing/decompressing apparatus including both the compressing apparatus and the decompressing apparatus according to each of the above embodiments may be configured.

A procedure of deriving the linear to cubic equations used in each of the above embodiments will be described. At first, the procedure of deriving the equations used at the compression rate of 1/6 (in the first and second embodiments) will be described.

(1) 1/6 Compression

T6(Fq) is assumed as torus and the torus subgroup takes a trace expression for compressing the expression. The order of T6(Fq) is the cyclotomic polynomial $\Phi_6 = q^2 - 2 + 1$. The cyclotomic polynomial $\Phi_6$ can be factorized into $\Phi_6 = q^2 - q + 1 = (q + \sqrt{(3q)} + 1)(q - \sqrt{(3q)} + 1)$, therefore, if $(q + \sqrt{(3q)} + 1)$ and $(q - \sqrt{(3q)} + 1)$ are each an integer, T6(Fq) can be divided into the subgroup having the order $(q + \sqrt{(3q)} + 1)$ and the subgroup having the order $(q - \sqrt{(3q)} + 1)$. In other words, when q is raised to the odd-number-th power of 3, the subgroups can be compatibly configured by the above factorization.

The subgroup having the order $(q + \sqrt{(3q)} + 1)$ is assumed as G+ and the subgroup having the order $(q - \sqrt{(3q)} + 1)$ is assumed as G_. Since the mapping from the element in the subgroup of T6(Fq) into the element in the trace expression is not bijective, a plurality of elements for T6(Fq) are present for an inverse map of a certain element in the trace expression. Since six elements are present for T6(Fq) corresponding to one trace expression, at least three additional bits are required for identifying the six elements. Since the bit length required for the expression is $\log\_2(q)+3$ bits including the three additional bits for both G+ and G_, G_ as a smaller group than q is not necessarily required but G_ is taken as a subgroup here.

Hereinafter, a relationship between the trace expression and the affine expression will be made clear and a method for enabling the decompression from the trace expression to the affine expression will be described. The following operations are all over $F(3^n)^6$ unless otherwise noted.

(2) Preparation (2.1) Condition for Extension Field

The extension field Fq6 obtained by six-order decompressing the finite field Fq by the modulus polynomial $\Phi_7$ is assumed and the compression/decompression map for the elements in the subgroup G_ of T6(Fq) is configured. The conditions for the algebraic torus, the modulus polynomial $\Phi_7$ and q are expressed in the equation (22).

$$\Phi_7 = 1 + x + x^2 + x^3 + x^4 + x^5 + x^6, x^7 = 1,$$

$$q \equiv 5 \bmod 7,$$

$$q = 3^n, (n \in Z),$$

$$(n \equiv 5 \bmod 12) \tag{22}$$

In this case, the modulus polynomial $\Phi_7$ is expressed in the equation (23) due to $q \equiv 5 \bmod 7$.

$$\Phi_7 = 1 + x + x^{q^4} + x^{q^5} + x^{q^2} + x^q + x^{q^3} \tag{23}$$

The basic fields Fq2 and Fq3 are assumed for Fq6 formed of the modulus polynomial $\Phi_7$ and the base y of Fq2 and the base z of Fq3 are decided as in the equation (24).

$$y = x + x^{q^3},$$

$$z = x + x^{q^2} + x^{q^4} \tag{24}$$

The equations (25) and (26) are obtained as relations for y and z from the conditions for the modulus polynomial $\Phi_7$ and q.

$$y + y^q + y^{q^2} + 1 = 0, \tag{25}$$

$$y^2 = (x + x^{q^3})^2$$
$$= (x + x^6)^2$$
$$= (x^2 + x^5 + 2)$$
$$= x^q + x^{q^4} + 2$$
$$= y^q + 2,$$

$$y^{q+1} = (x + x^{q^3})(x^q + x^{q^4})$$
$$= (x + x^6)(x^5 + x^2)$$
$$= (x^6 + x^3 + x^4 + x)$$
$$= y + y^{q^2}$$

$$z + z^q + 1 = 0, \tag{26}$$

$$z^2 = (x + x^{q^2} + x^{q^4})^2$$
$$= (x + x^4 + x^2)^2$$
$$= (x^2 + x + x^4 + 2x^5 + 2x^3 + 2x^6)$$
$$= z + 2z^q$$
$$= z^q - 1,$$

$$z^3 = (x + x^{q^2} + x^{q^4})^3$$
$$= (x + x^4 + x^2)^3$$
$$= (x^3 + x^5 + x^6)$$
$$= z^q,$$

$$z^{q+1} = (x + x^{q^2} + x^{q^4})(x^q + x^{q^3} + x^{q^5})$$
$$= (x + x^4 + x^2)(x^5 + x^6 + x^3)$$
$$= x^6 + 1 + x^4 + x^2 + x^3 + 1 + 1 + x + x^5$$
$$= -1$$

It is considered that n must be an odd number but the condition of $n \equiv 5 \bmod 12$ is not necessarily required. For simplified calculation, the following condition is employed for forming $y^t = y$ and $z^t = z^q$.

$f \in Fq3$ can be expressed in the equation (27) by use of the base y of Fq2 and $\delta_1, \delta_2, \delta_3 \in Fq$. Further, $f^t$ is expressed in the equation (28).

$$f = \delta_1 y + \delta_2 y^q + \delta_3 y^{q^2} \tag{27}$$

$$f^t = \delta_1' y + \delta_2' y^q + \delta_3' y^{q^2} \tag{28}$$

(2.2) Trace Map and Affine Map

The trace map of Fq6, Tr:Fq6→Fq, can be defined in the equation (29).

$$Tr(g) = g + g^q + g^{q^2} + g^{q^3} + g^{q^4} + g^{q^5} \tag{29}$$

The affine map $\phi: T6(Fq) \setminus \{1\} \to Fq3$ is defined for $g = \sigma_0 + \sigma_1 z \in T6(Fq)$ in the equation (30). Herein, 1 is a unit element of the multiplication of Fq6.

$$\psi(g) = \frac{-(\sigma_0 + 1)}{\sigma_1} \in F_{q^3} \tag{30}$$

The affine inverse map $\phi-1: Fq3 \to T6(Fq) \setminus \{1\}$ is defined in the equation (31).

$$\psi^{-1}(f) = \frac{f + z}{f + z^q} \tag{31}$$

In this case, the equation (32) is known to be established.

$$\psi^{-1}(\psi(g))=g\in T_6(F_q)\subset F_{q^6} \quad (32)$$

The equation (29) corresponds to the trace map Tr in the equation (1). The equations (30) and (31) correspond to the affine transform map Af and the affine transform inverse map Af$\{-1\}$ in the equation (2).

(3) Calculation of T6(Fq) Trace

In order to derive the relationship between the trace expression Tr(g) for g and the affine expression for g (f in the equation (27)), the elements in the affine expression are used to express the elements in the trace expression. It is expressed in the equation (33).

$$\begin{aligned}
Tr(g) &= \left\{\frac{f+z}{f+z^q}\right\} + \left\{\frac{f+z}{f+z^q}\right\}^q + \left\{\frac{f+z}{f+z^q}\right\}^{q^2} + \left\{\frac{f+z}{f+z^q}\right\}^{q^3} + \\
&\quad \left\{\frac{f+z}{f+z^q}\right\}^{q^4} + \left\{\frac{f+z}{f+z^q}\right\}^{q^5}, \\
&= \frac{f+z}{f+z^q} + \frac{f^q+z^q}{f^q+z} + \frac{f^{q^2}+z}{f^{q^2}+z^q} + \frac{f+z^q}{f+z} + \frac{f^q+z}{f^q+z^q} + \frac{f^{q^2}+z^q}{f^{q^2}+z}, \\
&= \frac{(f+z)^2+(f+z^q)^2}{(f+z)(f+z^q)} + \frac{(f^q+z)^2+(f^q+z^q)^2}{(f^q+z)(f^q+z^q)} + \\
&\quad \frac{(f^{q^2}+z)^2+(f^{q^2}+z^q)^2}{(f^{q^2}+z)(f^{q^2}+z^q)}, \\
&= \frac{2f^2+2f(z+z^q)+(z^2+z^{2q})}{f^2+f(z+z^q)+z^{q+1}} + \\
&\quad \frac{2f^{2q}+2f^q(z+z^q)+(z^2+z^{2q})}{f^{2q}+f^q(z+z^q)+z^{q+1}} + \\
&\quad \frac{2f^{2q^2}+2f^{q^2}(z+z^q)+(z^2+z^{q^2})}{f^{2q^2}+f^{q^2}(z+z^q)+z^{q+1}}, \\
&= \frac{2f^2-2f-3}{f^2-f-1} + \frac{2f^{2q}-2f^q-3}{f^{2q}-f^q-1} + \frac{2f^{2q^2}-2f^{q^2}-3}{f^{2q^2}-f^{q^2}-1}, \\
&= \frac{2f^2-2f}{f^2-f-1} + \frac{2f^{2q}-2f^q}{f^{2q}-f^q-1} + \frac{2f^{2q^2}-2f^{q^2}}{f^{2q^2}-f^{q^2}-1}, \\
&= \left\{2+\frac{2}{f^2-f-1}\right\} + \left\{2+\frac{2}{f^{2q}-f^q-1}\right\} + \\
&\quad \left\{2+\frac{2}{f^{2q^2}-f^{q^2}-1}\right\}, \\
&= \frac{2}{f^2-f-1} + \frac{2}{f^{2q}-f^q-1} + \frac{2}{f^{2q^2}-f^{q^2}-1}, \\
&= 2\left\{\frac{1}{f^2-f-1} + \frac{1}{(f^2-f-1)^q} + \frac{1}{(f^2-f^q-1)^{q^2}}\right\}, \\
&= -\left\{\frac{1}{f^2-f-1} + \frac{1}{(f^2-f-1)^q} + \frac{1}{(f^2-f^q-1)^{q^2}}\right\}
\end{aligned} \quad (33)$$

where, if h=f$^2$−f−1, $A_{1y}+A_{2y}{}^q+A_{3y}{}^{\{q^3\}}$=h$^{-1}$ are assumed, the equation (34) is obtained.

$$\begin{aligned}
Tr(g) &= -(h^{-1}+h^{-q}+h^{-q^2}), \\
&= -(A_1+A_2+A_3)(y+y^q+y^{q^2}), \\
&= A_1+A_2+A_3
\end{aligned} \quad (34)$$

Thus, it can be seen that Tr(g) is expressed by the sum of elements in h$^{-1}$. h is expressed in the equation (35).

$$\begin{aligned}
h &= (\delta_1 y+\delta_2 y^q+\delta_3 y^{q^2})^2 - (\delta_1 y+\delta_2 y^q+\delta_3 y^{q^2}) - 1, \\
&= \begin{pmatrix} \delta_1^2 y^2+\delta_2^2 y^{2q}+\delta_3^2 y^{2q^2}+2\delta_1\delta_2 y^{q+1}+ \\ 2\delta_2\delta_3 y^{q^2+q}+2\delta_3\delta_1 y^{q^2+1} \end{pmatrix} - \\
&\quad (\delta_1 y+\delta_2 y^q+\delta_3 y^{q^2}) - 1, \\
&= y(\delta_3^2+2\delta_1\delta_2+2\delta_2\delta_3-\delta_1+1) + \\
&\quad y^q(\delta_1^2+\delta_2\delta_3+2\delta_3\delta_1-\delta_1+1) + \\
&\quad y^{q^2}(\delta_2^2+2\delta_1\delta_2+2\delta_3\delta_1-\delta_3+1) + 2(\delta_1^2+\delta_2^2+\delta_3^2), \\
&= y(\delta_1^2+\delta_2^2-\delta_3^2+2\delta_1\delta_2+2\delta_2\delta_3-\delta_1+1) + \\
&\quad y^q(-\delta_1^2+\delta_2^2+\delta_3^2+\delta_2\delta_3+2\delta_3\delta_1-\delta_2+1) + \\
&\quad y^{q^2}(\delta_1^2-\delta_2^2+\delta_3^2+2\delta_1\delta_2+2\delta_3\delta_1-\delta_3+1)
\end{aligned} \quad (35)$$

Thus, h$^{-1}$ is calculated and the sum of its elements is taken so that Tr(g) is obtained. When it is developed into an equation, the denominator of Tr(g) is expressed in the equation (36). Since the numerator will be described later and is omitted here.

$$\begin{aligned}
&[Tr(g)\text{denominator}] = \\
&(\delta_1^6+\delta_2^6+\delta_3^6)+(\delta_1\delta_2^5+\delta_2\delta_3^5+\delta_3\delta_1^5)+(\delta_1^4\delta_2^2+\delta_2^4\delta_3^2+\delta_3^4\delta_1^2) + \\
&(\delta_1^4\delta_2\delta_3+\delta_1\delta_2^4\delta_3+\delta_1\delta_2\delta_3^4)+(\delta_1^2\delta_2^4+\delta_2^2\delta_3^4+\delta_3^2\delta_1^4) - \\
&(\delta_1^3\delta_2^3+\delta_2^3\delta_3^3+\delta_3^3\delta_1^3)-(\delta_1^3\delta_2^2\delta_3+\delta_1\delta_2^3\delta_3^2+\delta_1^2\delta_2\delta_3^3) + \\
&\delta_1^2\delta_2^2\delta_3^2-(\delta_1^5+\delta_2^5+\delta_3^5)+(\delta_1\delta_2^4+\delta_2\delta_3^4+\delta_3\delta_1^4) + \\
&(\delta_1^3\delta_2\delta_3+\delta_1\delta_2^3\delta_3+\delta_1\delta_2\delta_3^3)-(\delta_1^2\delta_2^3+\delta_2^2\delta_3^3+\delta_3^2\delta_1^3) + \\
&(\delta_1^2\delta_2^2\delta_3+\delta_1^2\delta_2\delta_3^2+\delta_1\delta_2^2\delta_3^2)-(\delta_1^4+\delta_2^4+\delta_3^4) + \\
&(\delta_1^2\delta_2^2+\delta_2^2\delta_3^2+\delta_3^2\delta_1^2)+(\delta_1^3+\delta_2^3+\delta_3^3)-(\delta_1^2\delta_2+\delta_2^2\delta_3+\delta_3^2\delta_1) + \\
&\delta_1\delta_2\delta_3+(\delta_1^2+\delta_2^2+\delta_3^2)-(\delta_1\delta_2+\delta_2\delta_3+\delta_3\delta_1)+(\delta_1+\delta_2+\delta_3)-1
\end{aligned} \quad (36)$$

(4) Conditional Equation of G_in T6(Fq)

f$\{q+1\}$ is expressed in the equation (37).

$$\begin{aligned}
f^{q+1} &= (\delta_3 y+\delta_1 y^q+\delta_2^y q^2)(\delta_1 y+\delta_2 y^q+\delta_3 y^{q^2}), \\
&= \delta_1\delta_3 y^2+\delta_1\delta_2 y^{2q}+\delta_2\delta_3^y 2q^2+(\delta_1^2+\delta_2\delta_3)y^{q+1} + \\
&\quad (\delta_2^2+\delta_1\delta_3)y^{q^2+q}+(\delta_3^2+\delta_1\delta_2)y^{q^2+1}, \\
&= \delta_1\delta_3(y^q+2)+\delta_1\delta_2(y^{q^2}+2)+\delta_2\delta_3(y+2) + \\
&\quad (\delta_1^2+\delta_2\delta_3)(y+y^{q^2})+(\delta_2^2+\delta_1\delta_3)(y+y^q) + \\
&\quad (\delta_3^2+\delta_1\delta_2)(y^q+y^{q^2}), \\
&= (\delta_2\delta_3+\delta_1^2+\delta_2\delta_3+\delta_2^2+\delta_1\delta_3)y + \\
&\quad (\delta_1\delta_3+\delta_3^2+\delta_1\delta_3+\delta_2^2+\delta_1\delta_2)y^q + \\
&\quad (\delta_1\delta_2+\delta_1^2+\delta_2\delta_3+\delta_3^2+\delta_1\delta_2)y^{q^2} + \\
&\quad 2(\delta_1\delta_3+\delta_1\delta_2+\delta_2\delta_3), \\
&= (\delta_1^2+\delta_2^2+2\delta_2\delta_3+\delta_1\delta_3)y + \\
&\quad (\delta_2^2+\delta_3^2+2\delta_1\delta_3+\delta_1\delta_2)y^q + \\
&\quad (\delta_3^2+\delta_1^2+2\delta_1\delta_2+\delta_2\delta_3)y^{q^2}+2(\delta_1\delta_3+\delta_1\delta_2+\delta_2\delta_3), \\
&= \{(\delta_1^2+\delta_2^2+2\delta_2\delta_3+\delta_1\delta_3)+(\delta_1\delta_3+\delta_1\delta_2+\delta_2\delta_3)\}y +
\end{aligned} \quad (37)$$

-continued $$\{(\delta_2^2 + \delta_3^2 + 2\delta_1\delta_3 + \delta_1\delta_2) + (\delta_1\delta_3 + \delta_1\delta_2 + \delta_2\delta_3)\}y^q +$$

$$\{(\delta_3^2 + \delta_1^2 + 2\delta_1\delta_2 + \delta_2\delta_3) + (\delta_1\delta_3 + \delta_1\delta_2 + \delta_2\delta_3)\}y^{q^2},$$

$$= (\delta_1^2 + \delta_2^2 + 2\delta_1\delta_3 + \delta_1\delta_2)y +$$

$$(\delta_2^2 + \delta_3^2 + 2\delta_1\delta_2 + \delta_2\delta_3)y^q +$$

$$(\delta_3^2 + \delta_1^2 + 2\delta_2\delta_3 + \delta_1\delta_3)\}y^{q^2}$$

Since the order of $G\_$ is $q-t+1$, the element of $G\_$ is raised to the $(q-t+1)$-th power to be 1. That is, the equation (38) is obtained.

$$g \in F_{q^6}, f \in F_{q^3}, g = \frac{f+z}{f+z^q}, t = \sqrt{3q} \qquad (38)$$

$$g^{q-t+1} = 1$$

Thus, $g^{q+1}=g^t$ is obtained. $g^{q+1}=g^t$ is arranged and then the equation (39) is obtained.

$$g \cdot g^q = g^t \left\{ \frac{f+z}{f+z^q} \right\} \left\{ \frac{f^q+z^q}{f^q+z} \right\} \qquad (39)$$

$$= \left\{ \frac{f^t + z^t}{f^t + z^{qt}} \right\}, (f+z)(f^q + Z^q)(f^t + z)$$

$$= (f+z^q)(f^q+z)(f^t+z^q), f^{q+t+1} + z(f^{q+t}+f^{q+1}) +$$

$$z^q f^{t+1} + z^{q+1}(f^t + f) + z^2 f^q + z^{q+2}$$

$$= f^{q+t+1} + zf^{t+1} + z^q(f^{q+t} + f^{q+1}) + z^{q+1}(f^t + f) +$$

$$z^{2q}f^q + z^{2q+1}, z(f^{q+t}+f^{q+1}) + z^q f^{t+1} + (z+z^q)$$

$$(f^t + f) + (z + 2z^q)f^q + 2z$$

$$= zf^{t+1} + z^q(f^{q+t} + f^{q+1}) + (z+z^q)(f^t + f) +$$

$$(2z + z^q)f^q + 2z, z(f^{q+t} + f^{q+1} + f^t + f + f^q + 2) +$$

$$z^q(f^{t+1} + f^t + f + 2f^q)$$

$$= z(f^{t+1} + f^t + f + 2f^q) +$$

$$z^q(f^{q+t} + f^{q+1} + f^t + f + f^q + 2),$$

$$z(f^{q+t} + f^{q+1} + f^q + 2) + z^q(f^{t+1} + 2f^q)$$

$$= z(f^{t+1} + 2f^q) + z^q(f^{q+t} + f^{q+1} + f^q + 2)$$

The conditional equation of $G\_$ is expressed in the equation (40). As expressed in the equation (40), the same equation can be derived from either condition.

$$z: f^{q+t} + f^{q+1} - f^{t+1} - f^q + 2 = 0,$$

$$z^q: f^{q+t} + f^{q+1} - f^{t+1} - f^q + 2 = 0 \qquad (40)$$

The equation is further developed by use of f in the equation (27) and then the equations (41) to (43) are obtained.

$$y: \delta_1'(\delta_3 - \delta_2) + \delta_3'(\delta_1 + \delta_2 + \delta_3) + 2\delta_3\delta_1 + \delta_1\delta_2 + \delta_1^2 + \delta_2^2 - \delta_3 = 2, \qquad (41)$$

$$y^q: \delta_2'(\delta_1 - \delta_3) + \delta_1'(\delta_1 + \delta_2 + \delta_3) + 2\delta_1\delta_2 + \delta_2\delta_3 + \delta_2^2 + \delta_3^2 - \delta_1 = 2, \qquad (42)$$

$$y^{q^2}: \delta_3'(\delta_2 - \delta_1) + \delta_2'(\delta_1 + \delta_2 + \delta_3) + 2\delta_2\delta_3 + \delta_3\delta_1 + \delta_3^2 + \delta_1^2 - \delta_2 = 2 \qquad (43)$$

(4.1) Conditional Equation of T2(Fq)

The conditional equation for T2(Fq3) is also arranged due to T2(Fq3)∈T6(Fq)∈G\_. Since the order of T2(Fq3) is $q^2-q+1$, $g^{\wedge}(q^2-q+1)=1$ is established. The conditional equation for $\delta 1$, $\delta 2$, and $\delta 3$ is arranged from the above equation. It is expressed in the equation (44).

$$\left\{ \frac{f+z}{f+z^q} \right\}^{q^2-q+1} = 1, \qquad (44)$$

$$\rightarrow \left\{ \frac{f+z}{f+z^q} \right\}^{q^2+1} = \left\{ \frac{f+z}{f+z^q} \right\}^q,$$

$$\rightarrow \left\{ \frac{f+z}{f+z^q} \right\}^{q^2} \left\{ \frac{f+z}{f+z^q} \right\} = \left\{ \frac{f+z}{f+z^q} \right\}^q,$$

$$\rightarrow \left\{ \frac{f^{q^2}+z}{f^{q^2}+z^q} \right\} \left\{ \frac{f+z}{f+z^q} \right\} = \left\{ \frac{f^q+z^q}{f^q+z} \right\},$$

$$\rightarrow (f^{q^2}+z)(f+z)(f^q+z) = (f^{q^2}+z^q)(f+z^q)(f^q+z^q),$$

$$\rightarrow f^{q^2+q+1} + (f^{q^2+q} + f^{q^2+1} + f^{q+1})z + (f^{q^2} + f^q + f)z^2 + z^3 =$$

$$f^{q^2+q+1} + (f^{q^2+q} + f^{q^2+1} + f^{q+1})z^q + (f^{q^2} + f^q + f)z^{2q} + z^{3q},$$

$$\rightarrow (f^{q^2+q} + f^{q^2+1} + f^{q+1})z + (f^{q^2} + f^q + f)z^2 + z^3 =$$

$$(f^{q^2+q} + f^{q^2+1} + f^{q+1})z^q + (f^{q^2} + f^q + f)z^{2q} + z^{3q},$$

$$\rightarrow (f^{q^2+q} + f^{q^2+1} + f^{q+1})(z - z^q) +$$

$$(f^{q^2} + f^q + f)(z^q - 1 - z + 1) - (z - z^q) = 0$$

Thus, the equation (45) is obtained.

$$f^{q^2+q} + f^{q^2+1} + f^{q+1} - f^{q^2} - f^q - f - 1 = 0 \qquad (45)$$

When the transform is continued by use of the equation (27), the relationship in the equation (46) is obtained. The equation is used for the subsequent transform of equations.

$$f^{q^2+q} + f^{q^2+1} + f^{q+1} - f^{q^2} - f^q - f - 1 = 0,$$

$$\rightarrow \{(f^{q+1})^{q^2} + (f^{q+1})^q + f^{q+1}\} - \{f^{q^2} + f^q + f\} - 1 = 0,$$

$$\rightarrow \{(\delta_1^2 + \delta_2^2 + 2\delta_1\delta_3 + \delta_1\delta_2) + (\delta_2^2 + \delta_3^2 + 2\delta_1\delta_2 + 2\delta_2\delta_3) +$$
$$(\delta_3^2 + \delta_1^2 + 2\delta_2\delta_3 + \delta_1\delta_3)\}(y + y^q + y^{q^2}) - (\delta_1 + \delta_2 + \delta_3)$$
$$(y + y^q + y^{q^2}) - 1 = 0,$$

$$\rightarrow \{(2\delta_1^2 + 2\delta_2^2 + 2\delta_3^2) - (\delta_1 + \delta_2 + \delta_3)\}(y + y^q + y^{q^2}) - 1 = 0,$$

$$\rightarrow \{(\delta_1^2 + \delta_2^2 + \delta_3^2) + (\delta_1 + \delta_2 + \delta_3)\} - 1 = 0,$$

$$\rightarrow \{(\delta_1^2 + \delta_2^2 + \delta_3^2) + (\delta_1 + \delta_2 + \delta_3)\} = 1 \qquad (46)$$

(5) Affine Expression Having the Same Trace Value

The trace value of an element is the same as the trace value of the q-th power of the element. From the property, at least six affine expressions having the same trace value are present. The relationship between the affine expressions will be considered. In the case of f∈Fq3, the relational equation is expressed in the equation (47).

$$Tr\left(\frac{f+z}{f+z^q}\right) = Tr\left(\frac{f^q+z^q}{f+z}\right) = \qquad (47)$$

$$Tr\left(\frac{f^{q^2}+z}{f+z^q}\right) = Tr\left(\frac{f+z^q}{f+z}\right) = Tr\left(\frac{f^q+z}{f+z^q}\right) = Tr\left(\frac{f^{q^2}+z^q}{f+z}\right)$$

Since the $q^2$-th power in the affine expression leads to the rearrangement of elements and thus a difference in the affine expression at the $q^3$-th power of an element is considered.

Since the equation (48) is established, when an element is raised to the $q^3$-th power, the affine expression has a value obtained by subtracting 1 from the doubled element.

$$\left(\frac{f+z}{f+z^q}\right)^{q^2} = \frac{f+z^q}{f+z} = \frac{f-1-z}{f-1-z^q} = \frac{(f+2)+2z}{(f+2)+2z^q} = \frac{(2f+1)+z}{(2f+1)+z^q} \quad (48)$$

When the combinations of elements having the same trace value are derived in consideration of the equation (27) and the first equation in the equation (25) $(y+y^q+y\hat{\ }(q^2)=-1)$, the following six combinations are obtained.

$(\delta_1, \delta_2, \delta_3)$
$(2\delta_3-1, 2\delta_1-1, 2\delta_2-1)$
$(\delta_2, \delta_3, \delta_1)$
$(2\delta_1-1, 2\delta_2-1, 2\delta_3-1)$
$(\delta_3, \delta_1, \delta_2)$
$(2\delta_2-1, 2\delta_3-1, 2\delta_1-1)$ It can be seen that the elements are rearranged due to the $q^2$-th power. In the case of $\alpha=\delta_1-1$, $\beta=\delta_2-1$, and $\gamma=\delta_3-1$, the equation (49) is obtained.

$$f=(\alpha+1)y+(\beta+1)y^q+(\gamma+1)y^{q^2} \quad (49)$$

The $q^3$-th power of f is expressed in the equation (50).

$$\begin{aligned} f^{q^3} &= (2\delta_1-1)y + (2\delta_2-1)y^q + (2\delta_3-1)y^{q^2}, \\ &= 2(\delta_1+1)y + 2(\delta_2+1)y^q + 2(\delta_3+1)y^{q^2}, \\ &= 2(\alpha-1)y + 2(\beta-1)y^q + 2(\gamma-1)y^{q^2} \end{aligned} \quad (50)$$

When $\alpha$, $\beta$ and $\gamma$ are expressed as described above, the q-th power can be considered as the doubling and the elements' rearrangement. $2\times 2 = 1 \pmod 3$ has also to be paid attention. In the following, the equation transform is performed by replacing $\delta_1$, $\delta_2$ and $\delta_3$ with $\alpha+1$, $\beta+1$ and $\gamma+1$, respectively.

(5.1) Calculation of T6(Fq) Trace (Version 2)

The transform of the trace equation by $\alpha$, $\beta$ and $\gamma$ is assumed. The equation (36) is transformed into the equation (51). The numerator is expressed in the equation (52).

$$[Tr(g)\text{denominator}] = \quad (51)$$
$$(\alpha+\beta+\gamma)^6 + (\alpha\beta^5 + \beta\gamma^5 + \gamma\alpha^5) + (\alpha^4\beta^2 + \beta^4\gamma^2 + \gamma^4\alpha^2) +$$
$$\alpha\beta\gamma(\alpha+\beta+\gamma)^3 + (\alpha^2\beta^4 + \beta^2\gamma^4 + \gamma^2\alpha^4) -$$
$$\alpha\beta\gamma(\alpha^2\beta+\beta^2\gamma+\gamma^2\alpha) - \alpha^2\beta^2\gamma^2 - (\alpha^3\beta+\beta^3\gamma+\gamma^3\alpha) -$$
$$\alpha\beta\gamma(\alpha+\beta+\gamma) - (\alpha^2+\beta^2+\gamma^2) - (\alpha\beta+\beta\gamma+\gamma\alpha) + 1$$

$$[Tr(g)\text{numerator}] = -(\alpha^3\beta+\beta^3\gamma+\gamma^3\alpha) - \quad (52)$$
$$\alpha\beta\gamma(\alpha+\beta+\gamma) + (\alpha^2+\beta^2+\gamma^2) + (\alpha\beta+\beta\gamma+\gamma\alpha)$$

(5.2) Conditional Equation of T2(Fq) (Version 2)

The equation (46) is transformed by use of $\alpha$, $\beta$ and $\gamma$ into the equation (53).

$$\alpha^2+\beta^2+\gamma^2=1 \quad (53)$$

(5.3) Conditional Equation of G_ in T6(Fq) (Version 2)

The equations (41) to (43) are transformed by use of $\alpha$, $\beta$ and $\gamma$ into the three equations, respectively.

$$\alpha^t(\gamma-\beta)+\gamma^t(\alpha+\beta+\gamma)-\alpha\gamma+\alpha\beta+\alpha^2+\beta^2=1$$

$$\beta^t(\alpha-\gamma)+\alpha^t(\alpha+\beta+\gamma)-\beta\alpha+\beta\gamma+\beta^2+\gamma^2=1$$

$$\gamma^t(\beta-\alpha)+\beta^t(\alpha+\beta+\gamma)-\gamma\beta+\gamma\alpha+\gamma^2+\alpha^2=1$$

The terms with the t-th power in the equations are expressed in the equation (54).

$$\alpha^t = \frac{\begin{array}{c}-\alpha^4-\beta^4+\gamma^4-\alpha^3\beta+\beta^3\gamma+\alpha\beta^3-\\ \gamma\alpha^3+\alpha^2\beta\gamma^2-\alpha\beta\gamma^2-\alpha^2+\beta^2-\gamma^2-\alpha\beta-\beta\gamma\end{array}}{(\alpha+\beta+\gamma)^3+(\alpha^2\beta+\beta^2\gamma+\gamma^2\alpha)-(\alpha\beta^2+\beta\gamma^2+\gamma\alpha^2)} \quad (54)$$

$$\beta^t = \frac{\begin{array}{c}\alpha^4-\beta^4-\gamma^4-\beta^3\gamma+\gamma^3\alpha+\beta\gamma^3-\alpha\beta^3+\\ \beta^2\gamma^2-\alpha^2\beta\gamma-\beta^2+\gamma^2-\alpha^2-\beta\gamma-\gamma\alpha\end{array}}{(\alpha+\beta+\gamma)^3+(\alpha^3\beta+\beta^2\gamma+\gamma^2\alpha)-(\alpha\beta^2+\beta\gamma^2+\gamma\alpha^2)},$$

$$\gamma^t = \frac{\begin{array}{c}-\alpha^4+\beta^4-\gamma^4-\gamma^3\alpha+\alpha^3\beta+\gamma\alpha^3-\\ \beta\gamma^3+\gamma^2\alpha^2-\alpha\beta^2\gamma-\gamma^2+\alpha^2-\beta^2-\gamma\alpha-\alpha\beta\end{array}}{(\alpha+\beta+\gamma)^3+(\alpha^2\beta+\beta^2\gamma+\gamma^2\alpha)-(\alpha\beta^2+\beta\gamma^2+\gamma\alpha^2)},$$

$$(\alpha^t+\beta^t+\gamma^t) =$$

$$\frac{-(\alpha^2+\beta^2+\gamma^2)^2-(\alpha+\beta+\gamma)^2}{(\alpha+\beta+\gamma)^3+(\alpha^3\beta+\beta^2\gamma+\gamma^2\alpha)-(\alpha\beta^2+\beta\gamma^2+\gamma\alpha^2)}$$

The equation (55) is obtained by the equation (53).

$$\alpha^t = \frac{\alpha^2+\alpha\beta^2-(\alpha\beta^3+\beta\gamma^3+\gamma\alpha^3)}{(\alpha+\beta+\gamma)+(\alpha\beta^2+\beta\gamma^2+\gamma\alpha^2)}, \quad (55)$$

$$\beta^t = \frac{\beta^2+\beta\gamma^2-(\alpha\beta^3+\beta\gamma^3+\gamma\alpha^3)}{(\alpha+\beta+\gamma)+(\alpha\beta^2+\beta\gamma^2+\gamma\alpha^2)},$$

$$\gamma^t = \frac{\gamma^2+\gamma\alpha^2-(\alpha\beta^3+\beta\gamma^3+\gamma\alpha^3)}{(\alpha+\beta+\gamma)+(\alpha\beta^2+\beta\gamma^2+\gamma\alpha^2)},$$

$$(\alpha+\beta+\gamma)^t = \frac{-1-(\alpha+\beta+\gamma)^2}{(\alpha+\beta+\gamma)+(\alpha\beta^2+\beta\gamma^2+\gamma\alpha^2)}$$

From the equations, the relationship expressed in the equation (56) is also obtained.

$$(\alpha+\beta+\gamma)+(\alpha\beta^2+\beta\gamma^2+\gamma\alpha^2) = \frac{-1-(\alpha+\beta+\gamma)^2}{(\alpha+\beta+\gamma)^t}, \quad (56)$$

$$\to (\alpha\beta^2+\beta\gamma^2+\gamma\alpha^2) = \frac{-1-(\alpha+\beta+\gamma)^2}{(\alpha+\beta+\gamma)^t} - (\alpha+\beta+\gamma)$$

(5.4) Calculation of T6(Fq) Trace (Version 3)

The equations (51) and (52) are transformed by the equation (53). The two kinds of finally symmetrical equations $(\alpha+\beta+\gamma)$ and $\alpha\beta\gamma$, and an asymmetrical equation $(\alpha\beta^2+\beta\gamma^2+\gamma\alpha^2)$ are used as many times as possible. The equations are also simplified here by use of $A=\alpha+\beta+\gamma$, $B=\alpha\beta^2+\beta\gamma^2+\gamma\alpha^2$, $C=\alpha\beta\gamma$.

First, the relationship expressed in the equation (57) is obtained.

$$\alpha\beta+\beta\gamma+\gamma\alpha = 1-(\alpha+\beta+\gamma)^2, \quad (57)$$
$$= 1-A^2,$$

$$\alpha^2\beta+\beta^2\gamma+\gamma^2\alpha = (\alpha+\beta+\gamma)(\alpha^2+\beta^2+\gamma^2)-(\alpha+\beta+\gamma)^3 -$$
$$(\alpha\beta^2+\beta\gamma^2+\gamma\alpha^2),$$
$$= (\alpha+\beta+\gamma)\{1-(\alpha+\beta+\gamma)^2\} -$$
$$(\alpha\beta^2+\beta\gamma^2+\gamma\alpha^2),$$
$$= A(1-A^2)-B,$$

-continued $$\alpha^2\beta^2 + \beta^2\gamma^2 + \gamma^2\alpha^2 = (\alpha\beta + \beta\gamma + \gamma\alpha)^2 + \alpha\beta\gamma(\alpha + \beta + \gamma),$$
$$= 1 + (\alpha + \beta + \gamma)^2 + (\alpha + \beta + \gamma)^4 + \alpha\beta\gamma(\alpha + \beta + \gamma),$$
$$= 1 + A^2 + A^4 + AC,$$

$$\alpha\beta^3 + \beta\gamma^3 + \gamma\alpha^3 = (\alpha + \beta + \gamma)(\alpha\beta^2 + \beta\gamma^2 + \gamma\alpha^2) - (\alpha^2\beta^2 + \beta^2\gamma^2 + \gamma^2\alpha^2) - \alpha\beta\gamma(\alpha + \beta + \gamma),$$
$$= (\alpha + \beta + \gamma)(\alpha\beta^2 + \beta\gamma^2 + \gamma\alpha^2) + \alpha\beta\gamma(\alpha + \beta + \gamma) - (\alpha + \beta + \gamma)^4 - (\alpha + \beta + \gamma)^2 - 1,$$
$$= AB + AC - A^4 - A^2 - 1,$$

$$\alpha^3\beta + \beta^3\gamma + \gamma^3\alpha = (\alpha + \beta + \gamma)(\alpha^2\beta + \beta^2\gamma + \gamma^2\alpha) - (\alpha^2\beta^2 + \beta^2\gamma^2 + \gamma^2\alpha^2) - \alpha\beta\gamma(\alpha + \beta + \gamma),$$
$$= (\alpha + \beta + \gamma)^2\{1 - (\alpha + \beta + \gamma)^2\} - (\alpha + \beta + \gamma)(\alpha\beta^2 + \beta\gamma^2 + \gamma\alpha^2) + \alpha\beta\gamma(\alpha + \beta + \gamma) - (\alpha + \beta + \gamma)^4 - (\alpha + \beta + \gamma)^2 - 1,$$
$$= (\alpha + \beta + \gamma)^4 - 1 + \alpha\beta\gamma(\alpha + \beta + \gamma) - (\alpha + \beta + \gamma)(\alpha\beta^2 + \beta\gamma^2 + \gamma\alpha^2),$$
$$= A^4 + AC - AB - 1,$$

$$\alpha^3\beta^2 + \beta^3\gamma^2 + \gamma^3\alpha^2 = (\alpha^2\beta + \beta^2\gamma + \gamma^2\alpha)(\alpha\beta + \beta\gamma + \gamma\alpha) - \alpha\beta\gamma(\alpha\beta + \beta\gamma + \gamma\alpha) - \alpha\beta\gamma,$$
$$= \begin{bmatrix}(\alpha + \beta + \gamma)\{1 - (\alpha + \beta + \gamma)^2\} - \\ (\alpha\beta^2 + \beta\gamma^2 + \gamma\alpha^2)\end{bmatrix} \times \{1 - (\alpha + \beta + \gamma)^2\} - \alpha\beta\gamma\{1 - (\alpha + \beta + \gamma)^2 - 1\},$$
$$= (\alpha + \beta + \gamma) - (\alpha + \beta + \gamma)^3 + \alpha\beta\gamma(\alpha + \beta + \gamma)^2 - (\alpha\beta^2 + \beta\gamma^2 + \gamma\alpha^2)\{1 - (\alpha + \beta + \gamma)^2\},$$
$$= (\alpha + \beta + \gamma) + (\alpha + \beta + \gamma)^3 + (\alpha + \beta + \gamma)^5 + (\alpha\beta^2 + \beta\gamma^2 + \gamma\alpha^2)\{(\alpha + \beta + \gamma)^2 - 1\} + \alpha\beta\gamma(\alpha + \beta + \gamma)^2,$$
$$= A + A^3 + A^5 + B(A^2 - 1) + A^2C,$$

$$\alpha^2\beta^3 + \beta^2\gamma^3 + \gamma^2\alpha^3 = (\alpha\beta^2 + \beta\gamma^2 + \gamma\alpha^2)(\alpha\beta + \beta\gamma + \gamma\alpha) - \alpha\beta\gamma(\alpha\beta + \beta\gamma + \gamma\alpha) - \alpha\beta\gamma,$$
$$= (\alpha\beta^2 + \beta\gamma^2 + \gamma\alpha^2)\{1 - (\alpha + \beta + \gamma)^2\} + \alpha\beta\gamma(\alpha + \beta + \gamma)^2,$$
$$= B - A^2B + A^2C,$$

-continued $$\alpha\beta^5 + \beta\gamma^5 + \gamma\alpha^5 = (\alpha\beta^2 + \beta\gamma^2 + \gamma\alpha^2)(\alpha + \beta + \gamma)^3 - (\alpha^4\beta^2 + \beta^4\gamma^2 + \gamma^4\alpha^2) - \alpha\beta\gamma(\alpha\beta^2 + \beta\gamma^2 + \gamma\alpha^2),$$
$$= (\alpha\beta^2 + \beta\gamma^2 + \gamma\alpha^2)(\alpha + \beta + \gamma)^3 - \left\{\begin{array}{l}(\alpha^2\beta + \beta^2\gamma + \gamma^2\alpha)^2 + \\ \alpha\beta\gamma(\alpha\beta^2 + \beta\gamma^2 + \gamma\alpha^2)\end{array}\right\} - \alpha\beta\gamma(\alpha\beta^2 + \beta\gamma^2 + \gamma\alpha^2),$$
$$= (\alpha\beta^2 + \beta\gamma^2 + \gamma\alpha^2)(\alpha + \beta + \gamma)^3 - \begin{bmatrix}(\alpha + \beta + \gamma)\{1 - (\alpha + \beta + \gamma)^2\} - \\ (\alpha\beta^2 + \beta\gamma^2 + \gamma\alpha^2)\end{bmatrix}^2 + \alpha\beta\gamma(\alpha\beta^2 + \beta\gamma^2 + \gamma\alpha^2),$$
$$= (\alpha\beta^2 + \beta\gamma^2 + \gamma\alpha^2)(\alpha + \beta + \gamma)^3 - (\alpha + \beta + \gamma)^2\{1 - (\alpha + \beta + \gamma)^2\}^2 - (\alpha\beta^2 + \beta\gamma^2 + \gamma\alpha^2)^2 - (\alpha\beta^2 + \beta\gamma^2 + \gamma\alpha^2)^2 (\alpha + \beta + \gamma)\{1 - (\alpha + \beta + \gamma)^2\} + \alpha\beta\gamma(\alpha\beta^2 + \beta\gamma^2 + \gamma\alpha^2),$$
$$= (\alpha\beta^2 + \beta\gamma^2 + \gamma\alpha^2) \left\{\begin{array}{l}-(\alpha\beta^2 + \beta\gamma^2 + \gamma\alpha^2) - \\ (\alpha + \beta + \gamma) - \\ (\alpha + \beta + \gamma)^3 + \alpha\beta\gamma\end{array}\right\} - (\alpha + \beta + \gamma)^2 - (\alpha + \beta + \gamma)^4 - (\alpha + \beta + \gamma)^6,$$
$$= -B^2 - AB - A^3B + BC - A^2 - A^4 - A^6$$

The relationship expressed in the equation (58) is obtained.

$$\{(\alpha\beta^2 + \beta\gamma^2 + \gamma\alpha^2) - (\alpha^2\beta + \beta^2\gamma + \gamma^2\alpha)\}^2 = \quad (58)$$
$$(\alpha^2\beta^4 + \beta^2\gamma^4 + \gamma^2\alpha^4) + (\alpha^4\beta^2 + \beta^4\gamma^2 + \gamma^4\alpha^2) - \alpha\beta\gamma(\alpha^2\beta + \beta^2\gamma + \gamma^2\alpha) - \alpha\beta\gamma(\alpha\beta^2 + \beta\gamma^2 + \gamma\alpha^2) +$$
$$(\alpha^3\beta^3 + \beta^3\gamma^3 + \gamma^3\alpha^3) + \alpha\beta\gamma(\alpha + \beta + \gamma)^3, =$$
$$(\alpha^4 + \beta^4 + \gamma^4)(\alpha^2\beta^2 + \beta^2\gamma^2) - (\alpha^3 + \beta^3 + \gamma^3)^2 - \alpha\beta\gamma(\alpha^2 + \beta^2 + \gamma^2)(\alpha + \beta + \gamma) - \alpha\beta\gamma(\alpha^3 + \beta^3 + \gamma^3), =$$
$$(\alpha^4 + \beta^4 + \gamma^4) - (\alpha + \beta + \gamma)^6 - \alpha\beta\gamma(\alpha + \beta + \gamma) -$$
$$\alpha\beta\gamma(\alpha + \beta + \gamma)^3, = (\alpha^2 + \beta^2 + \gamma^2)^2 + (\alpha^2\beta^2 + \beta^2\gamma^2 + \gamma^2\alpha^2) -$$
$$(\alpha + \beta + \gamma)^6 - \alpha\beta\gamma(\alpha + \beta + \gamma) - \alpha\beta\gamma(\alpha + \beta + \gamma)^3, =$$
$$1^2 + 1 + (\alpha + \beta + \gamma)^2 + (\alpha + \beta + \gamma)^4 + \alpha\beta\gamma(\alpha + \beta + \gamma) -$$
$$(\alpha + \beta + \gamma)^6 - \alpha\beta\gamma(\alpha + \beta + \gamma) - \alpha\beta\gamma(\alpha + \beta + \gamma)^3, =$$
$$-1 + (\alpha + \beta + \gamma)^2 + (\alpha + \beta + \gamma)^4 - (\alpha + \beta + \gamma)^6 - \alpha\beta\gamma(\alpha + \beta + \gamma)^3,$$
$$(\alpha\beta^2 + \beta\gamma^2 + \gamma\alpha^2) - (\alpha^2\beta + \beta^2\gamma + \gamma^2\alpha) =$$
$$-(\alpha + \beta + \gamma)\{1 - (\alpha + \beta + \gamma)^2\} - (\alpha\beta^2 + \beta\gamma^2 + \gamma\alpha^2)$$

The equation (59) is obtained from the equations (57) and (58).

$$\{(\alpha\beta^2 + \beta\gamma^2 + \gamma\alpha^2) - (\alpha^2\beta + \beta^2\gamma + \gamma^2\alpha)\}^2 = \quad (59)$$

$$\{(\alpha + \beta + \gamma)\{1 - (\alpha + \beta + \gamma)^2\} + (\alpha\beta^2 + \beta\gamma^2 + \gamma\alpha^2)\}^2, =$$

$$(\alpha + \beta + \gamma)^2\{1 - (\alpha + \beta + \gamma)^2\}^2 -$$

$$(\alpha + \beta + \gamma)\{1 - (\alpha + \beta + \gamma)^2\}(\alpha\beta^2 + \beta\gamma^2 + \gamma\alpha^2) +$$

$$(\alpha\beta^2 + \beta\gamma^2 + \gamma\alpha^2)^2, = (\alpha + \beta + \gamma)^2 + (\alpha + \beta + \gamma)^4 +$$

$$(\alpha + \beta + \gamma)^6 - \{(\alpha + \beta + \gamma) - (\alpha + \beta + \gamma)^3\}(\alpha\beta^2 + \beta\gamma^2 + \gamma\alpha^2) +$$

$$(\alpha\beta^2 + \beta\gamma^2 + \gamma\alpha^2)^2, =$$

$$-1 + (\alpha + \beta + \gamma)^2 + (\alpha + \beta + \gamma)^4 - (\alpha + \beta + \gamma)^6 - \alpha\beta\gamma(\alpha + \beta + \gamma)^3$$

Thus, the equation (60) is obtained.

$$(\alpha + \beta + \gamma)^6 - \{(\alpha+\beta+\gamma) - (\alpha+\beta+\gamma)^3\}(\alpha\beta^2+\beta\gamma^2+\gamma\alpha^2) + (\alpha\beta^2+\beta\gamma^2+\gamma\alpha^2)^2,$$

$$= -1 - (\alpha+\beta+\gamma)^6 - \alpha\beta\gamma(\alpha+\beta+\gamma)^3,$$

$$\rightarrow (\alpha\beta^2+\beta\gamma^2+\gamma\alpha^2)^2 = (\alpha+\beta+\gamma)^6 + \{(\alpha+\beta+\gamma) - (\alpha+\beta+\gamma)^3\}(\alpha\beta^2+\beta\gamma^2+\gamma\alpha^2) - \alpha\beta\gamma(\alpha+\beta+\gamma)^3 - 1$$

$$\rightarrow B^2 = A^6 - A^3(B+C) + AB - 1 \quad (60)$$

The equations (61) and (62) are obtained for C.

$$C = A^3 - B + \frac{AB - B^2 - 1}{A^3} \quad (61)$$

$$\alpha\beta\gamma = (\alpha + \beta + \gamma)^3 - (\alpha\beta^2 + \beta\gamma^2 + \gamma\alpha^2) + \quad (62)$$
$$\frac{(\alpha + \beta + \gamma)(\alpha\beta^2 + \beta\gamma^2 + \gamma\alpha^2) - (\alpha\beta^2 + \beta\gamma^2 + \gamma\alpha^2)^2 - 1}{(\alpha + \beta + \gamma)^3}$$

Tr(g) is deformed to obtain the equations (63) and (64) from the equations (51) and (52).

$$[Tr(g)\text{denominator}] = (\alpha + \beta + \gamma)^6 + (\alpha\beta^5 + \beta\gamma^5 + \gamma\alpha^5) + \quad (63)$$
$$(\alpha^4\beta^2 + \beta^4\gamma^2 + \gamma^4\alpha^2) +$$
$$\alpha\beta\gamma(\alpha + \beta + \gamma)^3 +$$
$$(\alpha^2\beta^4 + \beta^2\gamma^4 + \gamma^2\alpha^4) -$$
$$\alpha\beta\gamma(\alpha^2\beta + \beta^2\gamma + \gamma^2\alpha) + \alpha^2\beta^2\gamma^2 -$$
$$(\alpha^3\beta + \beta^3\gamma + \gamma^3\alpha) - \alpha\beta\gamma(\alpha + \beta + \gamma) -$$
$$(\alpha^2 + \beta^2 + \gamma^2) - (\alpha\beta + \beta\gamma + \gamma\alpha) + 1,$$
$$= (A^6) + \begin{pmatrix} -B^2 - AB - A^3B + \\ BC - A^2 - A^4 - A^6 \end{pmatrix} +$$
$$(\alpha^2\beta^2 + \beta^2\gamma^2 + \gamma^2\alpha^2)(\alpha^2 + \beta^2 + \gamma^2) +$$
$$(A^3C) - C\{A(1-A)^2 - B\} + C^2 -$$
$$(A^4 + AC - AB - 1) - AC - 1 -$$
$$(1 - A^2) + 1,$$
$$= -B^2 - A^3B + BC - A^4 +$$
$$(1 + A^2 + A^4 + AC) + A^3C +$$
$$(-AC + A^3C + BC) + C^2 - A^4 - AC +$$
$$1 - AC - 1,$$
$$= -B^2 - A^3B - BC + A^2 - A^3C + C^2 - A^4 + AC + 1,$$
$$= B^2 - A^3B - BC + A^2 - A^3C + C^2 - A^4 + AC + 1 +$$
$$(A^6 - A^3(B+C) + AB - 1),$$
$$= (B^2 - BC + C^2) + A^3(B+C) + A(B+C) + (A^2 - A^4 + A^6),$$
$$= (B+C)^2 + A(A^2+1)(B+C) + \{A(A^2+1)\}^2,$$
$$= (B + C - A^3 - A)^2$$

$$[Tr(g)\text{numerator}] = -(\alpha^3\beta + \beta^3\gamma + \gamma^3\alpha) - \alpha\beta\gamma(\alpha + \beta + \gamma) + \quad (64)$$
$$(\alpha^2 + \beta^2 + \gamma^2) + (\alpha\beta + \beta\gamma + \gamma\alpha),$$
$$= -(A^4 + AC - AB - 1) - AC + 1 + 1 - A^2,$$
$$= -A^4 + AC + AB - A^2,$$
$$= A(B + C - A^3 - A)$$

Common factors are present in the denominator and numerator and thus are cancelled to obtain the equations (65) and (66).

$$Tr(g) = \frac{A}{B + C - A^3 - A} \quad (65)$$

$$= \frac{\alpha + \beta + \gamma}{(\alpha\beta^2 + \beta\gamma^2 + \gamma\alpha^2) + \alpha\beta\gamma - (\alpha + \beta + \gamma)^3 - (\alpha + \beta + \gamma)} \quad (66)$$

The equations are continuously deformed by the equation (56) to obtain the equation (67).

$$Tr(g) = \frac{\alpha + \beta + \gamma}{(\alpha\beta^2 + \beta\gamma^2 + \gamma\alpha^2) + \alpha\beta\gamma - (\alpha + \beta + \gamma)^3 - (\alpha + \beta + \gamma)}, \quad (67)$$

-continued $$= \frac{\alpha+\beta+\gamma}{-1-(\alpha+\beta+\gamma)^2(\alpha+\beta+\gamma)^t-(\alpha+\beta+\gamma)+\alpha\beta\gamma-},$$
$$(\alpha+\beta+\gamma)^3-(\alpha+\beta+\gamma)$$

$$= \frac{\alpha+\beta+\gamma}{-1-(\alpha+\beta+\gamma)^2(\alpha+\beta+\gamma)^t+\alpha\beta\gamma-},$$
$$(\alpha+\beta+\gamma)^3-(\alpha+\beta+\gamma)$$

$$= \frac{(\alpha+\beta+\gamma)^{t+1}}{-1-(\alpha+\beta+\gamma)^2+\alpha\beta\gamma(\alpha+\beta+\gamma)^t-(\alpha+\beta+\gamma)^{t+3}+},$$
$$(\alpha+\beta+\gamma)^{t+1}$$

$$= \frac{A^{t+1}}{-1-A^2+CA^t-A^{t+3}+A^{t+1}}$$

(6) Transform from Trace into Torus

It can be seen that $Tr(g)$ can be written with $A=\alpha+\beta+\gamma$ and $C=\alpha\beta\gamma$. C can be written with A and $B=\alpha\beta^2+\beta\gamma^2+\gamma\alpha^2$ and B can be written with A so that $Tr(g)$ is written with A. The equation (68) is obtained from the equation (65).

$$Tr(g) = \frac{A}{B+C-A^3-A}, \tag{68}$$

$$= \frac{A}{\frac{A^3B+A^6-A^3B+AB-B^2-1}{A^3} - A^3 - A},$$

$$= \frac{A^4}{AB-B^2-1-A^4},$$

$$= \frac{A^4}{-A\left\{\frac{1+A^2}{A^t}+A\right\}-\left\{\frac{1+A^2}{A^t}+A\right\}^2-1-A^4},$$

$$= \frac{A^4}{-A-A^3+A+A^3 - A^2 - \frac{(1+A^2)^2}{A^{2t}} - A^2-1-A^4},$$

$$= \frac{A^4}{-(1+A^2)^2 - (A^2+1)^2},$$

$$= \frac{A^{2t+4}}{-(1+A^2)A^{2t}-(A^2+1)^2},$$

$$= \frac{A^{2t+4}}{-(1+A^2)^2(A^{2t}+1)},$$

$$= \frac{A^{2t+4}}{-(1+A^2)^2(A^2+1)^t},$$

$$= \frac{A^{2t+4}}{-(1+A^2)^{t+2}},$$

$$= \left\{-\frac{A^2}{1+A^2}\right\}^{t+2}$$

Both sides are raised to the t−2-th power and thus the equation (69) is obtained. The equation (70) is obtained from the equation (69). Thereby, $A=\alpha+\beta+\gamma$ can be obtained from $Tr(g)$.

$$\{Tr(g)\}^{t-2} = \left\{-\frac{A^2}{1+A^2}\right\}^{-1}, \tag{69}$$

$$= -\frac{A^2+1}{A^2},$$

$$= -1-\frac{1}{A^2}$$

$$\{Tr(g)\}^{t-2}+1 = -\frac{1}{A^2}, \tag{70}$$

$$\rightarrow A^2 = -[\{Tr(g)\}^{-2}+1]^{-1}$$

(7) Method for Deriving Cubic Equation

There will be described the method for obtaining β from $A=\alpha+\beta+\gamma$ and other relational equations. The relational equations obtained so far are as follows (the equations (71) to (74)).

$$A=\alpha+\beta+\gamma \tag{71}$$

$$B=\alpha\beta^2+\beta\gamma^2+\gamma\alpha^2 \tag{72}$$

$$C=\alpha\beta\gamma \tag{73}$$

$$\alpha^2+\beta^2+\gamma^2=1 \tag{74}$$

The equation (71) is deformed to obtain the equation (75).

$$\alpha=A-\beta-\gamma \tag{75}$$

The equation (75) is substituted into the equations (72), (73) and (74) for rearrangement to obtain the equations (76) to (78).

$$-\beta^3+\gamma^3+A\beta^2+A\beta\gamma+A\gamma^2+A^2\gamma-B=0 \tag{76}$$

$$-\beta^2\gamma-\beta\gamma^2+A\beta\gamma-C=0 \tag{77}$$

$$-\beta^2-\beta\gamma-\gamma^2+A\beta+A\gamma+A^2-1=0 \tag{78}$$

The equation (78) is multiplied by β to obtain the equation (79).

$$-\beta^3-\beta^2\gamma-\beta\gamma^2+A\beta^2+A\beta\gamma+(A^2-1)\beta=0 \tag{79}$$

The equation obtained by subtracting the equation (77) from the equation (79) is multiplied by −1 to obtain the equation (80).

$$\beta^3-A\beta^2-(A^2-1)\beta-C=0 \tag{80}$$

Since $B=((-1-A^2)/At)-A$ is obtained from the equation (56) and $C=A^3-B+(AB-B^2-1)/A^3$ is obtained from the equation (61), C can be written with A. Thus, the following cubic equation having the root of β is obtained. The equation is solved to obtain β.

$$x^3-Ax^2-(A^2-1)x-C=0$$

(8) Method for Deriving Linear Equation

A method for obtaining γ from $A=\alpha+\beta+\gamma$ and other relational equations. The equation (78) is multiplied by γ to obtain the equation (81).

$$-\beta^2\gamma-\beta\gamma^2-\gamma^3+A\beta\gamma+A\gamma^2+(A^2-1)\gamma=0 \tag{81}$$

Subtracting equation (77) from the equation (81) obtains the equation (82).

$$-\gamma^3+A\gamma^2+(A^2-1)\gamma+C=0 \tag{82}$$

Further, subtracting the equation (80) from the equation (76) and then adding the equation (82) obtains the equation (83).

$$A\beta\gamma-A\gamma^2+(-A^2+1)\beta+(-A^2-1)\gamma-B=0 \tag{83}$$

The equation obtained by multiplying the equation (83) by β and the equation obtained by multiplying the equation (77) by A are the equations (84) and (85), respectively.

$$A\beta^2\gamma - A\beta\gamma^2 + (-A^2+1)\beta^2 + (-A^2-1)\beta\gamma - B\beta = 0 \quad (84)$$

$$-A\beta^2\gamma - A\beta\gamma^2 + A^2\beta\gamma - AC = 0 \quad (85)$$

Subtracting the equation (85) from the equation (84) obtains the equation (86).

$$-A\beta^2\gamma + (-A^2+1)\beta^2 + (A^2-1)\beta\gamma - B\beta + AC = 0 \quad (86)$$

The equation (86) is divided by A and arranging for γ to obtain the equation (87).

$$(-\beta^2 + (A-(1/A))\beta)\gamma + (-A+(1/A))\beta^2 - B\beta/A + C = 0 \quad (87)$$

Since A, B, C and β are the constant values from the solutions of quadric equations and the cubic equations previously found, the linear equation (88) having the root of γ is obtained.

$$(-\beta^2 + (A-(1/A))\beta)x + (-A+(1/A))\beta^2 - B\beta/A + C = 0 \quad (88)$$

When β and γ are found, α is found from the equation (71).

(9) Summary

There is given the method for obtaining the affine expression (α+1, β+1, γ+1) from the trace expression Tr(g) of the elements in the algebraic torus subgroup by solving the equation (89).

$$x^2 = -[\{Tr(g)\}^{t-2} + 1]^{-1}$$

$$-x^3 + Ax^2 + (A^2-1)x + C = 0$$

$$(-A\beta^2 + (A^2-1)\beta)x + (-A^2+1)\beta^2 - B\beta + AC = 0 \quad (89)$$

The specific procedure is as follows.

To obtain two solutions by solving $x^2 = -[\{Tr(g)\}^{t-2}+1]^{-1}$ which is a quadric equation having the root of α+β+γ.

To obtain three solutions by solving $x^3 - Ax^2 - (A^2-1)x - C = 0$ which is a cubic equation having the root of β found by substituting the two solutions into A, respectively.

To obtain one solution and calculate a corresponding α by solving $(-\beta^2 + (A-(1/A))\beta)x + (-A+(1/A))\beta^2 - B\beta/A + C = 0$ which is a linear equation having the root of γ, the linear equation being obtained by substituting one of the solutions of the quadric equation into A and one of the solutions of the cubic equation corresponding to A into β.

Since a total of six (α, β, γ) are obtained from the above, an additional bit is used to specify a correct (α, β, γ).

A method for deriving an equation used at the compression rate of 1/4 (in the third and fourth embodiments) will be described below.

(1) 1/4 Compression

T4(Fq) is assumed as torus and the trace (trace expression) is taken as a subgroup. Since the cyclotomic polynomial Φ4 is factorized to obtain $\Phi 4 = q^2 + 1 = (q + \sqrt{(2q)} + 1)(q - \sqrt{(2q)} + 1)$, if the terms take an integer, the torus can be divided into the subgroups. Specifically, when q is raised to the odd-number-th power of 2, the subgroups can be compatibly configured by the factorization.

It is assumed that the subgroup having the order of $(q+\sqrt{(2q)}+1)$ is G+ and the subgroup having the order of $(q-\sqrt{(2q)}+1)$ is G_. Since the mapping from an element in the subgroup in the torus into an element in the trace is not bijective, there are multiple elements of the torus to be mapped from elements of a trace. Since four elements in a trace corresponding to the elements in one trace are present (see the trace expression for details), two additional bits are required for identifying the four elements. In the following, a relationship between the trace and the affine expression will be made clear and the method for decompressing the trace to the affine expression will be described. The following operations are over F(2^n)^4 unless otherwise noted.

(2) Preparation (2.1) Arrangement of Conditions

T=√(2q) is assumed.

The definition expressed in the equation (90) and the condition of q≡t≡2 (mod 5) are set for preventing a contradiction between the torus and the trace to be considered and for easily deforming the equations.

$$1 + x + x^q + x^{q^2} + x^{q^3} = 0, \quad (90)$$

$$y = x + x^{q^2},$$

$$z = x + x^q,$$

$$g \in T_4(F_q), \; g = \frac{f+z}{f+z^q},$$

$$f \in F_{q^2}, \; f = \delta_1 y + \delta_2 y^q$$

Under the definition and the condition, the substitutions such as $x = x^1$, $x^q = x^2$, $x^{q^2} = x^4$, $x^{q^3} = x^3$ are possible. Under the definition and the hypothesis, the conditional equation expressed in the equation (91) is obtained.

$$y^{q+1} = (x + x^{q^2})(x^q + x^{q^3}) \quad (91)$$
$$= x^{q+1} + x^{q^3+1} + x^{q^2+q} + x^{q^3+q^2},$$
$$= x^3 + x^4 + x + x^2 (q=2 \bmod 5 \text{ is used}),$$
$$= y + y^q = 1.$$

$$y^2 = x^2 + x^{2q^2},$$
$$= x^2 + x^3,$$
$$= x^q + x^{q^3},$$
$$= y^q.$$

$$y^{2q} = y^q(1+y),$$
$$= y^q + y^{q+1},$$
$$= y^q + 1,$$
$$= y \cdot (\text{method of } y^2 \text{ is also available})$$

$$z^2 = (x + x^q)^2 = x^2 + x^{2q} = x^2 + x^4 = x^q + x^{q^2} = z^q.$$

$$z^{2q} = (x^q + x^{q^2})^2 = x^{2q} + x^{2q^2} = x^4 + x^3 = x^{q^2} + x^{q^3} = z^{q^2},$$

$$z^{q^2+1} = (x + x^q)(x^q + x^{q^3})$$
$$= (x + x^2)(x^3 + x^4) = x^4 + x = x + x^{q^2} = y.$$

$$z^{q+1} = (x + x^q)(x^q + x^{q^2})$$
$$= (x + x^2)(x^2 + x^4) = x^3 + 1 + x^4 + x = x^2 = x^q.$$

$$z^{q^2+q} = (x^{q^2} + x^{q^3})(x^q + x^{q^2}) = (x^4 + x^3)(x^2 + x^4)$$
$$= x + x^3 + 1 + x^2 = x^4 = x^{q^2}.$$

$$z^{q^3+q^2+q} = (x^{q^3} + x)x^{q^2} = (x^3 + x)x^4 = x^2 + 1 = x^q + 1.$$

(2.2) Frequently-used Relational Equations

First, the equation (92) collectively describes the relational equations of f used for deforming the equations in the following.

$$f^2 = \delta_1^2 y^2 + 2\delta_1\delta_2 y^{q+1} + \delta_2^2 y^{2q}, \qquad (92)$$
$$= \delta_1^2 y^q + \delta_2^2 y.$$

$$f^{2q} = \delta_1^2 y^{2q} + 2\delta_1\delta_2 y^{q+1} + \delta_2^2 y^2,$$
$$= \delta_1^2 y + \delta_2^2 y^q.$$

$$f^{q+1} = (\delta_1 y + \delta_2 y^q)(\delta_1 y^q + \delta_2 y),$$
$$= (\delta_1^2 + \delta_2^2)y^{q+1} + \delta_1\delta_2(y^2 + y^{2q}),$$
$$= \delta_1^2 + \delta_2^2 + \delta_1\delta_2(y + y^q),$$
$$= \delta_1^2 + \delta_1\delta_2 + \delta_2^2.$$

$$f^{q+2} = (\delta_1 y^q + \delta_2 y)(\delta_1^2 y^q + \delta_2^2 y),$$
$$= \delta_1^3 y^{2q} + (\delta_2^2\delta_2 + \delta_1\delta_2^2)y^{q+1} + \delta_2^3 y^2,$$
$$= \delta_1^3 y + \delta_2^3 y^q + \delta_1^2\delta_2 + \delta_1\delta_2^2,$$

$$f^{2q+1} = (\delta_1^2 y + \delta_2^2 y^q)(\delta_1 y + \delta_2 y^q),$$
$$= \delta_1^3 y^2 + (\delta_1^2\delta_2 + \delta_1\delta_2^2)y^{q+1} + \delta_2^3 y^{2q},$$
$$= \delta_1^3 y^q + \delta_2^3 y + \delta_1^2\delta_2 + \delta_1\delta_2^2.$$

$$f^{2q+2} = (f^{q+1})^2,$$
$$= (\delta_1^2 + \delta_1\delta_2 + \delta_2^2)^2.$$

$$f^2 + f + y = (\delta_1^2 y^q + \delta_2^2 y) + (\delta_1 y + \delta_2 y^q) + y,$$
$$= (\delta_2^2 + \delta_1 + 1)y + (\delta_1^2 + \delta_2)y^q.$$

$$(f^2 + f + y)^{q+1} = \{(\delta_2^2 + \delta_1 + 1)y + (\delta_1^2 + \delta_2)y^q\}^{q+1},$$
$$= \{(\delta_2^2 + \delta_1 + 1)y^q + (\delta_1^2 + \delta_2)y\}$$
$$\quad \{(\delta_2^2 + \delta_1 + 1)y + (\delta_1^2 + \delta_2)y^q\},$$
$$= (\delta_2^2 + \delta_1 + 1)^2 y^{q+1} + (\delta_1^2 + \delta_2)(\delta_2^2 + \delta_1 + 1)$$
$$\quad (y + y^q) + (\delta_1^2 + \delta_2)^2 y^{q+1}\},$$
$$= (\delta_1^2 + \delta_2^2 + \delta_1 + \delta_2 + 1)^2 +$$
$$\quad (\delta_1^2\delta_2^2 + \delta_1^3 + \delta_2^3 + \delta_1\delta_2 + \delta_1^2 + \delta_2),$$
$$= \delta_1^4 + \delta_1^2\delta_2^2 + \delta_2^4 + \delta_1^3 + \delta_2^3 + \delta_1\delta_2 +$$
$$\quad \delta_2^2 + \delta_2 + 1.$$

(3) Trace Expressed in Components of Torus

The value of the trace is calculated by use of the coefficients used in the affine expression. The definition equation of the trace expression $Tr(g)$ for T4 is $Tr(g) = g + g^q + g^{q^2} + g^{q^3}$ (corresponding to the equation (16)). The equation (93) indicates the calculation process.

$$Tr(g) = \frac{f+z}{f+z^{q^2}} + \frac{f^q+z^q}{f^q+z^{q^3}} + \frac{f^{q^2}+z^{q^2}}{f^{q^2}+z^{q^2}} + \frac{f^{q^3}+z^{q^3}}{f^{q^3}+z^{q^3}}, \qquad (93)$$
$$= \frac{f+z}{f+z^{q^2}} + \frac{f^q+z^q}{f^q+z^{q^3}} + \frac{f+z^{q^2}}{f+z} + \frac{f^q+z^{q^3}}{f^q+z^q},$$
$$= \frac{(f+z)^2 + (f+z^{q^2})^2}{(f+z)(f+z^{q^2})} + \frac{(f^q+z^q)^2 + (f^q+z^{q^3})^2}{(f^q+z^{q^3})(f^q+z^q)},$$
$$= \frac{2f^2 + 2f(z+z^{q^2}) + z^2 + z^{2q^2}}{f^2 + f(z+z^{q^2}) + z^{q^2+1}} +$$
$$\quad \frac{2f^{2q} + 2f^{2q}(z^q+z^{q^3}) + z^{2q} + z^{2q^3}}{f^{2q} + f^q(z^q+z^{q^3}) + z^{q+q^3}},$$
$$= \frac{z^2 + z^{2q^2}}{f^2 + f(z+z^{q^2}) + (z^{q^2+1})} + \frac{z^{2q} + z^{2q^3}}{f^{2q} + f^q(z^q+z^{q^3}) + z^{q+q^3}},$$
$$= \frac{1}{f^2+f+y} + \frac{1}{f^{2q}+f^q+y^q},$$
$$= \frac{f^2 + f^{2q} + f + f^q + y + y^q}{(f^2+f+y)(f^{2q}+f^q+y^q)},$$
$$= \frac{(\delta_1^2+\delta_2^2)(y+y^q) + (\delta_1+\delta_2)(y+y^q) + (y+y^q)}{(f^2+f+y)^{q+1}},$$
$$= \frac{\delta_1^2 + \delta_2^2 + \delta_1 + \delta_2 + 1}{\delta_1^4 + \delta_1^2\delta_2^2 + \delta_2^4 + \delta_1^3 + \delta_2^3 + \delta_1\delta_2 + \delta_2^2 + \delta_2 + 1}.$$

(4) Condition for G_

The condition for $g^{q+1} = g^t$, which is the condition for G_, is derived here. The deformed equation expressed in the equation (94) is obtained.

$$\left\{\frac{f+z}{f+z^{q^2}}\right\}^{q+1} = \left\{\frac{f+z}{f+z^{q^2}}\right\}^t, \qquad (94)$$
$$\to (f+z)^{q+1}(f+z^{q^2})^t = (f+z)^t(f+z^{q^2})^{q+1},$$
$$\to (f+z)(f+z)^q(f+z^{q^2})^t = (f+z)^t(f+z^{q^2})^q(f+z^{q^2}),$$
$$\to f^{q+t+1} + f^{q+t}z + f^{q+t}z^{q^2} +$$
$$\quad f^{t+1}z^q + f^q z^{tq^2+1} + f^t z^{q+1} + fz^{q+tq^2} + z^{q+tq^2+1} =$$
$$\quad f^{q+t+1} + f^{q+t}z^{q^2} + f^{q+1}z^t + f^{t+1}z^{q^3} + f^q z^{t+q^2} +$$
$$\quad f^t z^{q^3+q^2} + fz^{q^3+t} + z^{q^3+q^2+t},$$
$$\to f^{q+t}(z+z^{q^2}) + f^{q+1}(z^{tq^2}+z^t) + f^{t+1}(z^q+z^{q^3}) +$$
$$\quad f^q(z^{tq^2+1}+z^{t+q^2}) + f^t(z^{q+1}+z^{q^3+q^2}) +$$
$$\quad f(z^{q+tq^2}+z^{q^3+t}) + (z^{q+tq^2+1}+z^{q^3+q^2+t}) = 0$$

In the following, $t \equiv q \pmod 5 \equiv 2 \pmod 5$ is assumed. In this case, t is based on the condition of $t = 2^{4k+1}$ ($k\in Z$ (set of integers)) and is not incompatible with the above hypothesis. It can be also configured with other parameter. The deformed equation expressed in the equation (95) is possible from the equation (94).

$$\to f^{q+t}(z+z^{q^2}) + f^{q+1}(z^{q^3}+z^q) + f^{t+1}(z^q+z^{q^3}) + f^q(z^{q^3+1}+z^{q+q^2}) + f^t(z^{q+1}+z^{q^3+q^2}) + f(z^{q+q^3}+z^{q^3+q}) + (z^{q+q^3+1}+z^{q^3+q^2+q}) = 0,$$

$$\to f^{q+t} + f^{q+1} + f^{t+1} + f^q y + f^q y^q + (1 + x^q + 1 + x^{q^3}) = 0,$$

$$\to f^{q+t} + f^{q+1} + f^{t+1} + f^q y + f^q y^q + y^q = 0 \qquad (95)$$

$f=\delta_{1y}+\delta_{2y^q}$ is substituted and arranged. First, as expressed in the equation (96), the relational equations used for deforming the equations are collectively calculated.

$$f^{q+t} = (\delta_1 y^q + \delta_2 y)(\delta_1^t y^q + \delta_2^t y), \quad (96)$$
$$= \delta_1^{t+1} y^{2q} + \delta_{t+1} y^2 + (\delta_1^t \delta_2 + \delta_1 \delta_2^t) y^{q+1},$$
$$= \delta_1^{t+1} y + \delta_2^{t+1} y^q + \delta_1^t \delta_2 + \delta_1 \delta_2^t.$$

$$f^{q+1} = \delta_1^2 + \delta_1 \delta_2 + \delta_2^2 \cdot \text{(described above)}$$

$$f^{t+1} = (\delta_1^t y^q + \delta_2^t y)(\delta_1 y + \delta_2 y^q),$$
$$= \delta_1^{t+1} y^{q+1} + \delta_{t+1} y^{q+1} + \delta_1^t \delta_2 y^{2q} + \delta_1 \delta_2^t y^2,$$
$$= \delta_1^{t+1} + \delta_2^{t+1} + \delta_1^t \delta_2 y + \delta_1 \delta_2^t y^q.$$

$$f^q y = \delta_1 y^{q+1} + \delta_2 y^2 = \delta_1 + \delta_2 y^q.$$
$$f^t y^q = \delta_1^t y^{2q} + \delta_2^t y^{q+1} = \delta_1^t y + \delta_2^t.$$

The conditional equations for G_ are rearranged with the above equations to be written in the equation (97).

$$\rightarrow f^{q+t} + f^{q+1} + f^{t+1} + f^q y + f y^q + y^q = 0,$$

$$\rightarrow (\delta_1^{t+1} y + \delta_2^{t+1} y^q + \delta_1^t \delta_2 + \delta_1 \delta_2^t) + (\delta_1^2 + \delta_1 \delta_2 + \delta_2^2) +$$
$$\delta_1^{t+1} + \delta_2^{t+1} + \delta_1^t \delta_2 y + \delta_1 \delta_2^t y^q) + (\delta_1 + \delta_2 y^q) + (\delta_1^t y + \delta_2^t) + y^q = 0,$$

$$\rightarrow (\delta_2^{t+1} + \delta_1 \delta_2^t + \delta_1^t) y + (\delta_1^{t+1} + \delta_1^t \delta_2 + \delta_2 + 1) y^q + (\delta_1^2 + \delta_1 \delta_2 + \delta_2^2 + \delta_1 + \delta_2^t) = 0 \quad (97)$$

From the above, the condition for $f \in G_-$ is expressed in the equation (98).

$$y: \delta_2^{t+1} + \delta_1 \delta_2^t + \delta_1^t + (\delta_1^2 + \delta_1 \delta_2 + \delta_2^2 + \delta_1 + \delta_2^t) = 0,$$

$$y^q: \delta_1^{t+1} + \delta_1^t \delta_2 + \delta_2 + 1 + (\delta_1^2 + \delta_1 \delta_2 + \delta_2^2 + \delta_1 + \delta_2^t) = 0 \quad (98)$$

The conditional equations are additionally arranged to obtain the equation (99).

$$\delta_1^{t+1} + \delta_1 \delta_2^t + \delta_1^t + \delta_2^{t+1} + \delta_1^t \delta_2 + \delta_2 + 1 = 0,$$

$$\rightarrow \delta_1^{t+1} + \delta_2^{t+1} + \delta_1^t \delta_2 + \delta_1 \delta_2^t + \delta_1^t + \delta_2 + 1 = 0,$$

$$\rightarrow (\delta_1 + \delta_2)^{t+1} + \delta_1^t + \delta_2 + 1 = 0. \quad (99)$$

At least the equation (99) has to be met for the elements of G_.

(5) Change by q-th Power

Since the definition equation of the trace expression Tr(g) for T4 is $\text{Tr}(g) = g + g^q + g^{q^2} + g^{q^3}$, the relational equations $\text{Tr}(g^q) = g^q + g^{q^2} + g^{q^3} + g$, $\text{Tr}(g^{q^2}) = g^{q^2} + g^{q^3} + g + g^q$ and $\text{Tr}(g^{q^3}) = g^{q^3} + g + g^q + g^{q^2}$ are established. In other words, the trace of the element which is obtained by raising the element g of a torus to the q-th power has the same value of the original trace. Since it is clear that even the element of the torus belonging to G_ is raised to the q-th power, the resultant has the same value as the element of G_, the property should be maintained even when a conditional equation is raised to the q-th power. A change, which occurs to the coefficient when the element of the torus is raised to the q-th power, is observed and the change is applied to the following deformed equations.

$$\left\{\frac{f+z}{f+z^{q^2}}\right\}^q = \frac{f^q + z^q}{f^q + z^{q^3}}, \quad (100)$$

$$= \frac{\delta_1 y^q + \delta_2 y + (x^q + x^{q^2})}{\delta_1 y^q + \delta_2 y + (x^{q^3} + x)},$$

$$= \frac{\delta_1 y^q + (\delta_2 + 1)(x + x^{q^2}) + (x + x^q)}{\delta_1 y^q + (\delta_2 + 1)(x + x^{q^2}) + (x^{q^2} + x^{q^3})},$$

$$= \frac{(\delta_2 + 1)y + \delta_1 y^q + z}{(\delta_2 + 1)y + \delta_1 y^q + z^{q^2}}$$

Since the equations can be deformed as expressed in the equation (100), it can be seen that the coefficient changes as $(\delta_1, \delta_2) \rightarrow (\delta_2 + 1, \delta_1)$ in consideration of $f = \delta_{1y} + \delta_{2y}{}^q$. The change causes a change neither in the conditional equation for G_ nor in the transformed equation from the torus to the trace. Actually, the change is applied to the conditional equation for G_ to be the original equation, and thus the conditional equation for G_ does not change due to the change. In the following, the relationship between the equations, which are obtained by changing the coefficient due to the q-th power, is called q-th power symmetric relationship.

(6) Decompression from Trace to Torus

There will be attempted to derive the transformed equation from the trace to the torus by use of the transformed equation from the torus to the trace and the conditional equation for G_.

(6.1) Preparation

In the following, necessary relational equations are derived before transforming the trace to the torus. There is attempted to create the relational equation between $\delta_1^2 + \delta_2$ and $\delta_1 + \delta_2^2$ from the equation (99), which is the conditional equation for G_. The conditional equation for G_ is arranged to be $(\delta_1 + \delta_2)^{t+1} = \delta_1^t + \delta_2 + 1$. The arranged conditional equation is raised to the (t−1)-th power in consideration of $t^2 = 2$ to obtain the equation (101).

$$(\delta_1 + \delta_2) = (\delta_1^t + \delta_2 + 1)^{t-1},$$

$$\rightarrow (\delta_1 + \delta_2)(\delta_1^t + \delta_2 + 1) = (\delta_1^t + \delta_2 + 1)^t,$$

$$\rightarrow (\delta_1 + \delta_2)(\delta_1^t + \delta_2 + 1) = \delta_1^2 + \delta_2^t + 1 \quad (101)$$

The equation (101) is not q-th power symmetrical. Since the relationship needs to be maintained even when the coefficient is changed as $(\delta_1, \delta_2) \rightarrow (\delta_2 + 1, \delta_1)$ in order to meet the q-th power symmetry, the equation (102) obtained by making the equation (101) q-th power symmetric should be met simultaneously.

$$(\delta_1 + \delta_2 + 1)(\delta_1 + \delta_2^t) = \delta_1^t + \delta_2^2 \quad (102)$$

On the other hand, the equation (101) is added with $\delta_1 + \delta_1^2$ and then multiplied by $(\delta_1 + \delta_2 + 1)$ to obtain the equation (103).

$$(\delta_1 + \delta_2)(\delta_1^t + \delta_2 + 1) = \delta_1^2 + \delta_2^t + 1,$$

$$\rightarrow \delta_1 + \delta_2^t = \delta_1^t(\delta_1 + \delta_2) + \delta_1 \delta_2 + \delta_2^2 + \delta_1 + \delta_2 + \delta_1^2 + \delta_1 + 1,$$

$$\rightarrow \delta_1 + \delta_2^t = \delta_1^t(\delta_1 + \delta_2) + \delta_1 \delta_2 + \delta_2^2 + \delta_2 + \delta_1^2 + 1,$$

$$\rightarrow (\delta_1 + \delta_2^t)(\delta_1 + \delta_2 + 1) = \{\delta_1^t(\delta_1 + \delta_2) + \delta_1 \delta_2 + \delta_2^2 + \delta_2 + \delta_1^2 + 1\}(\delta_1 + \delta_2 + 1),$$

$$\rightarrow (\delta_1 + \delta_2^t)(\delta_1 + \delta_2 + 1) = \delta_1^t(\delta_1 + \delta_2)^2 + \delta_1^t(\delta_1 + \delta_2) + (\delta_1 + \delta_2 + 1)\delta_2 + (\delta_1^2 + 1)(\delta_1 + \delta_2 + 1),$$

$$\rightarrow (\delta_1 + \delta_2^t)(\delta_1 + \delta_2 + 1) = \delta_1^t(\delta_1^2 + \delta_2^2 + \delta_1 + \delta_2) + \delta_1^3 + \delta_2^3 + \delta_1^2 + \delta_1 + 1 = 0 \quad (103)$$

The equation (102) is substituted into the left side of the equation (103) to obtain the equation (104).

$$\rightarrow \delta_1^t + \delta_2^2 = \delta_1^t(\delta_1^2 + \delta_2^2 + \delta_1 + \delta_2) + \delta_1^3 + \delta_2^3 + \delta_1^2 + \delta_1 + 1,$$

$$\rightarrow \delta_1^t(\delta_1^2 + \delta_2^2 + \delta_1 + \delta_2 + 1) + \delta_1^3 + \delta_2^3 + \delta_1^2 + \delta_2^2 + \delta_1 + 1 = 0 \quad (104)$$

The equation is changed in the coefficient as $(\delta_1, \delta_2) \to (\delta_2+1, \delta_1)$ in consideration of the q-th power symmetric relationship to obtain the equation (105).

$\delta_1{}'(\delta_1{}^2+\delta_2{}^2+\delta_1+\delta_2+1)+\delta_1{}^3+\delta_2{}^3+\delta_1{}^2+\delta_2{}^2+\delta_1+1=0,$ $\to (\delta_2{}'+1)(\delta_1{}^2+\delta_2{}^2+\delta_1+\delta_2+1)+(\delta_2+1)^3+\delta_1{}^3+(\delta_2+1)^2+\delta_1{}^2+(\delta_2+1)+1=0,$ $\to \delta_2{}'(\delta_1{}^2+\delta_2{}^2+\delta_1+\delta_2+1)+(\delta_1{}^2+\delta_2{}^2+\delta_1+\delta_2+1)+(\delta_2{}^3+\delta_2{}^2+\delta_2+1)+\delta_1{}^3+(\delta_2+1)^2+\delta_1{}^2+(\delta_2+1)+1=0,$ $\to \delta_2{}'(\delta_1{}^2+\delta_2{}^2+\delta_1+\delta_2+1)+\delta_1{}^3+\delta_2{}^3+\delta_2{}^2+\delta_1+\delta_2+1=0$  (105)

The two equations (the equations (104) and (105)) are added to be the equation (106), and consequently the equation (107) is obtained.

$(\delta_1{}'+\delta_2{}')(\delta_1{}^2+\delta_2{}^2+\delta_1+\delta_2+1)+\delta_1{}^2+\delta_2=0$  (106)

$\delta_1{}^2+\delta_2=(\delta_1{}'+\delta_2{}')(\delta_1{}^2+\delta_2{}^2+\delta_1+\delta_2+1)$  (107)

The equation is changed in the coefficient as $(\delta_1, \delta_2) \to (\delta_2+1, \delta_1)$ in consideration of the q-th power symmetry to obtain the equation (108) and consequently the relational equation between $\delta_1{}^2+\delta_2$ and $\delta_1+\delta_2{}^2$ is obtained.

$\delta_1+\delta_2{}^2+1=(\delta_1{}'+\delta_2{}'+1)(\delta_1{}^2+\delta_2{}^2+\delta_1+\delta_2+1),$ $\delta_1+\delta_2{}^2=(\delta_1{}'+\delta_2{}'+1)(\delta_1{}^2+\delta_2{}^2+\delta_1+\delta_2+1)+1$  (108)

(6.2) Deformation of Trace Equation

The trace equation is expressed with $\delta_1$ and $\delta_2$ to obtain the equation (109).

$$Tr(g) = \frac{\delta_1^2 + \delta_2^2 + \delta_1 + \delta_2 + 1}{\delta_1^4 + \delta_1^2\delta_2^2 + \delta_2^4 + \delta_1^3 + \delta_2^3 + \delta_1\delta_2 + \delta_2^2 + \delta_2 + 1}$$  (109)

The equation is a little arranged to obtain the equation (110).

$(\delta_1{}^4+\delta_1{}^2\delta_2{}^2+\delta_2{}^4+\delta_1{}^3+\delta_2{}^3+\delta_1\delta_2+\delta_2{}^2+\delta_2+1)\{Tr(g)\}=(\delta_1{}^2+\delta_2{}^2+\delta_1+\delta_2+1),$ $\to \delta_1{}^4+\delta_1{}^2\delta_2{}^2+\delta_2{}^4+\delta_1{}^3+\delta_2{}^3+\delta_1\delta_2+\delta_2{}^2+\delta_2+1=(\delta_1{}^2+\delta_2{}^2+\delta_1+\delta_2+1)\{Tr(g)\}^{-1}$  (110)

The equation (110) is deformed by use of $\delta_1{}^2\delta_2{}^2+\delta_2{}^3=\delta_2{}^2(\delta_1{}^2+\delta_2)$ and $\delta_1{}^3+\delta_1\delta_2=\delta_1(\delta_1{}^2+\delta_2)$ to obtain the equation (111).

$\delta_1{}^4+\delta_1{}^2\delta_2{}^2+\delta_2{}^4+\delta_1{}^3+\delta_2{}^3+\delta_1\delta_2+\delta_2{}^2+\delta_2+1=(\delta_1{}^2+\delta_2{}^2+\delta_1+\delta_2+1)\{Tr(g)\}^{-1},$ $\to (\delta_1{}^4+\delta_2{}^4)+(\delta_2{}^2+\delta_1)(\delta_1{}^2+\delta_2)+(\delta_2{}^2+\delta_1{}^2)+(\delta_1{}^2+\delta_2)+1=(\delta_1{}^2+\delta_2{}^2+\delta_1+\delta_2+1)\{Tr(g)\}^{-1},$ $\to (\delta_1+\delta_2)^4+(\delta_1+\delta_2)^2+1+(\delta_1{}^2+\delta_2)(\delta_2{}^2+\delta_1+1)=(\delta_1{}^2+\delta_2{}^2+\delta_1+\delta_2+1)\{Tr(g)\}^{-1}$  (111)

The equations (107) and (108) are substituted into the equation (111) to be the equation (112), and consequently a quadric equation with two unknowns is obtained.

$(\delta_1+\delta_2)^4+(\delta_1+\delta_2)^2+1+(\delta_1{}^2+\delta_2)(\delta_2{}^2+\delta_1+1)=(\delta_1{}^2+\delta_2{}^2+\delta_1+\delta_2+1)\{Tr(g)\}^{-1},$ $\to (\delta_1+\delta_2)^4+(\delta_1+\delta_2)^2+1+(\delta_1{}'+\delta_2{}')(\delta_1{}'+\delta_2{}'+1)(\delta_1{}^2+\delta_2{}^2+\delta_1+\delta_2+1)^2=(\delta_1{}^2+\delta_2{}^2+\delta_1+\delta_2+1)\{Tr(g)\}^{-1},$ $\to (\delta_1{}^2+\delta_2{}^2+\delta_1+\delta_2+1)^2+(\delta_1{}'+\delta_2{}')(\delta_1{}'+\delta_2{}'+1)(\delta_1{}^2+\delta_2{}^2+\delta_1+\delta_2+1)^2=(\delta_1{}^2+\delta_2{}^2+\delta_1+\delta_2+1)\{Tr(g)\}^{-1},$ $\to (\delta_1{}^2+\delta_2{}^2+\delta_1+\delta_2+1)+(\delta_1{}'+\delta_2{}')(\delta_1{}'+\delta_2{}'+1)(\delta_1{}^2+\delta_2{}^2+\delta_1+\delta_2+1)=\{Tr(g)\}^{-1},$ $\to (\delta_1{}^2+\delta_2{}^2+\delta_1+\delta_2+1)\{(\delta_1{}'+\delta_2{}')(\delta_1{}'+\delta_2{}'+1)+1\}=\{Tr(g)\}^{-1},$ $\to (\delta_1{}^2+\delta_2{}^2+\delta_1+\delta_2+1)[\{(\delta_1+\delta_2)(\delta_1+\delta_2+1)\}^t+1]=\{Tr(g)\}^{-1},$ $\to (\delta_1{}^2+\delta_2{}^2+\delta_1+\delta_2+1)\{(\delta_1{}^2+\delta_2{}^2+\delta_1+\delta_2)^t+1\}=\{Tr(g)\}^{-1},$ $\to (\delta_1{}^2+\delta_2{}^2+\delta_1+\delta_2+1)(\delta_1{}^2+\delta_2{}^2+\delta_1+\delta_2+1)^t=\{Tr(g)\}^{-1},$ $\to (\delta_1{}^2+\delta_2{}^2+\delta_1+\delta_2+1)^{t+1}=\{Tr(g)\}^{-1},$ $\to \delta_1{}^2+\delta_2{}^2+\delta_1+\delta_2+1=[\{Tr(g)\}^{-1}]^{t-1},$ $\to \delta_1{}^2+\delta_2{}^2+\delta_1+\delta_2+1=\{Tr(g)\}^{1-t},$ $\to \delta_1{}^2+\delta_2{}^2+\delta_1+\delta_2+1=\{Tr(g)\}^{q-t}$  (112)

With $\delta_1+\delta_2=X$, the equation (112) is replaced with the quadric equation with one unknown in the equation (113).

$X^2+X+1=\{Tr(g)\}^{q-t}$  (113)

Although the formula for solving the quadric equation with two unknowns is not present, the field is specifically configured to find the solutions. If X is specifically found, the left side of the equation (107) can be replaced with $\delta_1{}^2+\delta_2=(X-\delta_2)^2+\delta_2=\delta_2{}^2+\delta_2+X^2$ so that the equation (114) is solved for $\delta_2$ to find $\delta_1$ and $\delta_2$.

$\delta_2{}^2+\delta_2=X^2+(X^2+X+1)X^t(=X^2+\{Tr(g)\}^{q-t}X^t)$  (114)

Since the equations (113) and (114) each have two solutions, $2\times2=4$ solutions should be found. The four solutions are obtained from the same trace value and the additional bit is used for specifying which solution of the four solutions expresses the element of the original torus.

The four solutions are in the q-th power symmetric relationship. In other words, the relationship of $(\delta_1, \delta_2) \to (\delta_2+1, \delta_1) \to (\delta_1+1, \delta_2+1) \to (\delta_2+1, \delta_1)(\to(\delta_1, \delta_2))$ is obtained. The arrow goes to the right each time the q-th power is raised and returns to the origin with the $q^4$-th power. From the relationship, for example, when the least significant bits for $\delta_1, \delta_2$ for a solution are paid attention, in the q-th power symmetric relationship in the case of (0, 0), the relationship of $(0, 0) \to (0, 1) \to (1, 1) \to (1, 0)(\to(0, 0))$ is obtained and each should be raised to the first power, the $q$-th power, $q^2$-th power and $q^3$-th power. Therefore, if the least significant bits for $\delta_1, \delta_2$ are employed as the additional bits, the element of the original correct torus can be specified from the element of the trace.

(6.3) Exemplary Specific Structure

The method for transforming the affine expression of the torus into the trace and the method for transforming the trace into the affine expression of the torus will be briefly described by way of example.

(From Torus to Trace)

Input: $(\delta_1, \delta_2)$

Output: $Tr(g)$, $(b_0, b_1)$ ($b_0, b_1$ are additional bits)

1. $Tr(g)$ is found from the equation (109).

2. $b_0$ is assumed as the least significant bit of $\delta_1$ and $b_1$ is assumed as the least significant bit of $\delta_2$ to output $Tr(g), (b_0, b_1)$.

(From Trace to Torus)

Input: $Tr(g), (b_0, b_1)$

Output: $(\delta_1, \delta_2)$

1. $X^2+X+1=\{Tr(g)\}^{q-t}$ is solved to find $X_0$ and $X_1$.

2. $\delta_2{}^2+\delta_2+X_0{}^2+X_0{}^t\{Tr(g)\}^{q-t}=0$ is solved to find $\delta_{2a}$ and $\delta_{2b}$.

3. $\delta_{1a}$ is found from $X_0=\delta_{1a}+\delta_{2a}$.

4. The least significant bit of $(\delta_{1a}, \delta_{2a})$ is compared with $(b_0, b_1)$, and when they are not coincident with each other, the procedure proceeds to 5, and when they are coincident, the procedure proceeds to 6.

5. The equation is reset to $(\delta_{1a}, \delta_{2a})=(\delta_{2a}+1, \delta_{1a})$ and the procedure returns to 4.

6. $(\delta_1, \delta_2)=(\delta_{1a}, \delta_{2a})$ is assumed and $(\delta_1, \delta_2)$ is output.

(7) Summary

The specific method for recovering the element of the T4 torus from the element of the trace by adding the additional bit has been described above. The expression can be compressed only to ⅓ relative to the size of the finite field in the conventional torus, but the expression can be gradually compressed to ¼ with the embodiments.

As described above, according to the first to fourth embodiments, the compressing apparatus and the decompressing apparatus can be efficiently realized for the modulus polynomials which cannot efficiently configure the decompressed map in the conventional method.

Figure 10:
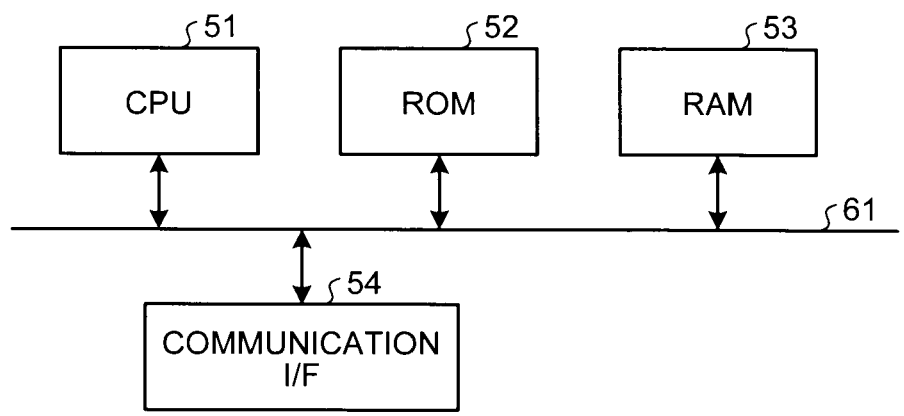
FIG. 10 is a hardware structure diagram of the decompressing apparatus and the compressing apparatus according to each embodiment.

A hardware structure of the decompressing apparatus and the compressing apparatus according to the first to fourth embodiments will be described below with reference to FIG. 10. FIG. 10 is an explanatory diagram illustrating a hardware structure of the decompressing apparatus and the compressing apparatus according to the first to fourth embodiments.

The decompressing apparatus and the compressing apparatus according to the first to fourth embodiments comprise a control device such as a CPU (Central Processing Unit) 51, storage devices such as ROM (Read Only Memory) 52 and RAM (Random Access Memory) 53, a communication I/F 54 connected to a network for making communication, and a bus 61 for interconnecting the respective units.

The programs to be executed by the decompressing apparatus and the compressing apparatus according to the first to fourth embodiments are previously incorporated in the ROM 52 or the like to be provided.

The programs to be executed by the decompressing apparatus and the compressing apparatus according to the first to fourth embodiments may be recorded in a computer-readable recording medium such as CD-ROM (Compact Disk Read Only Memory), flexible disk (FD), CD-R (Compact Disk Recordable) or DVD (Digital Versatile Disk) in an installable form or executable form to be provided as a computer program product.

The programs to be executed by the decompressing apparatus and the compressing apparatus according to the first to fourth embodiments may be stored on a computer connected to a network such as the Internet and may be downloaded via the network to be provided. The programs to be executed by the decompressing apparatus and the compressing apparatus according to the first to fourth embodiments may be provided or distributed via the network such as Internet.

The programs to be executed by the decompressing apparatus and the compressing apparatus according to the first to fourth embodiments can cause a computer to function as each unit in the decompressing apparatus and the compressing apparatus. The computer may read and execute a program from a computer-readable recording medium on a min storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decompressing apparatus comprising:
   an input microprocessor that inputs trace expression data, in which an element in a subgroup of a multiplicative group of a finite field is trace-expressed, and additional data, the additional data being obtained based on the trace expression data and affine expression data in which the trace expression data is affine-expressed;
   a calculating microprocessor that calculates a plurality of solutions of simultaneous equations derived by the trace expression data;
   a first selecting microprocessor that selects any of a plurality of items of affine expression data in which the element is affine-expressed based on the additional data, the affine expression data being found from the solutions; and
   a decompressing microprocessor that decompresses the selected affine expression data to the element, wherein the calculating microprocessor comprises:
      a first solution finding microprocessor that finds solutions of a first equation obtained by inputting the trace expression data into a preset coefficient of a previously-found $k_{1th}$-degree equation ($k_1$ is a preset integer of 1 or more) over the finite field; and
      a second solution finding microprocessor that finds solutions of a second equation obtained by inputting at least one of the solutions of the first equation into a preset coefficient of a previously-found $k_{2th}$-degree equation ($k_2$ is a preset integer of 1 or more) over the finite field, and
      the calculating microprocessor calculates a plurality of solutions of the simultaneous equations based on the solutions of the second equation.

2. The apparatus according to claim 1, wherein the first solution finding microprocessor finds two solutions of the first equation obtained by inputting the trace expression data into a preset coefficient in a previously-found quadric equation over the finite field,
   the second solution finding microprocessor finds three solutions of the second equation obtained by inputting at least one of the two solutions into a preset coefficient of a previously-found cubic equation over the finite field,
   the calculating microprocessor further comprises a third solution finding unit that finds solutions of a third equation obtained by inputting at least one of the two solutions of the first equation and the three solutions of the second equation into a preset coefficient of a previously-found linear equation over the finite field, and
   the calculating microprocessor calculates a plurality of solutions of the simultaneous equations based on the solutions of the second equation and the solutions of the third equation.

3. The apparatus according to claim 1, wherein the calculating microprocessor comprises a second selecting microprocessor that selects any of the solutions of the first equation based on the additional data, and
   the second solution finding microprocessor finds solutions of the second equation obtained by inputting a solution selected by the second selecting microprocessor into a preset coefficient of the $k_{2th}$-degree equation.

4. A compressing apparatus comprising:
- a first transforming microprocessor that transforms an element in a subgroup of a multiplicative group of a finite field into trace expression data in which the element is trace-expressed;
- a second transforming microprocessor that transforms the element into affine expression data in which the element is affine-expressed;
- a deciding microprocessor that decides additional data for finding the affine expression data based on the affine expression data;
- an output microprocessor that outputs the trace expression data and the additional data; and
- a calculating microprocessor that finds solutions of a first equation obtained by inputting the trace expression data into a preset coefficient of a previously-found $k_{1th}$-degree equation ($k_1$ is a preset integer of 1 or more) over the finite field, finds solutions of a second equation obtained by inputting at least one of the solutions of the first equation into a preset coefficient of a previously-found $k_{2th}$-degree equation ($k_2$ is a preset integer of 1 or more) over the finite field, and calculates a plurality of solutions of the simultaneous equations based on the solutions of the second equation,
- wherein the deciding microprocessor decides, as the additional data, the order of a solution coincident with the sum of elements of the affine expression data from a head when the solutions of the first equation are arranged in a preset rule, and the order of a solution coincident with the affine expression data from the head when the solutions of the simultaneous equations are arranged in the rule.

5. A program product having a non-transitory computer readable medium including programmed instructions, wherein the instructions, when executed by a computer, cause the computer to perform:
- inputting trace expression data, the trace expression data including an element in a subgroup of a multiplicative group of a finite field that is trace-expressed, and additional data, the additional data being obtained based on the trace expression data and affine expression data in which the trace expression data is affine-expressed;
- calculating a plurality of solutions of simultaneous equations derived by the trace expression data;
- selecting any of a plurality of items of affine expression data in which the element is affine-expressed based on the additional data, the affine expression data being found from the solutions; and
- decompressing the selected affine expression data to the element, wherein the calculating includes
- finding solutions of a first equation obtained by inputting the trace expression data into a preset coefficient of a previously-found $k_{1th}$-degree equation ($k_1$ is a preset integer of 1 or more) over the finite field; and
- finding solutions of a second equation obtained by inputting at least one of the solutions of the first equation into a preset coefficient of a previously-found $k_{2th}$-degree equation ($k_2$ is a preset integer of 1 or more) over the finite field, and
- calculating a plurality of solutions of the simultaneous equations based on the solutions of the second equation.

* * * * *